(12) United States Patent
Siebers et al.

(10) Patent No.: US 6,846,760 B2
(45) Date of Patent: Jan. 25, 2005

(54) FLAT FLOAT GLASS

(75) Inventors: Friedrich Siebers, Nierstein (DE); Peter Nass, Mainz (DE); Gerhard Lautenschläger, Jena (DE); Otmar Becker, Langen (DE)

(73) Assignee: Schott Glas, Mainz (DE)

( * ) Notice: Subject to any disclaimer, the term of this patent is extended or adjusted under 35 U.S.C. 154(b) by 325 days.

(21) Appl. No.: 09/829,409

(22) Filed: Apr. 9, 2001

(65) Prior Publication Data

US 2002/0023463 A1 Feb. 28, 2002

(30) Foreign Application Priority Data

Apr. 8, 2000 (DE) .......................................... 100 17 701

(51) Int. Cl.[7] .......................... C03C 14/00; C03C 3/083
(52) U.S. Cl. .............................. 501/32; 501/6; 501/69; 501/70
(58) Field of Search ............................ 501/4–7, 68–79, 501/32

(56) References Cited

U.S. PATENT DOCUMENTS

| 3,804,608 | A | | 4/1974 | Gaskell et al. | |
| 3,809,543 | A | * | 5/1974 | Gaskell et al. | ............... 65/33.8 |
| 4,239,521 | A | | 12/1980 | Beall | |
| 4,835,121 | A | * | 5/1989 | Shibuya et al. | ................. 501/4 |
| 4,851,372 | A | | 7/1989 | Lindig et al. | |
| 5,010,041 | A | * | 4/1991 | Koyama et al. | ............... 501/4 |
| 5,070,045 | A | * | 12/1991 | Comte et al. | .................. 501/4 |
| 5,212,122 | A | * | 5/1993 | Pannhorst et al. | ............ 501/69 |
| 5,446,008 | A | * | 8/1995 | Krolla et al. | ................. 501/68 |

FOREIGN PATENT DOCUMENTS

| DE | 19857117 | 6/2000 |
| EP | 1029830 | 8/2000 |
| GB | 1249728 | 10/1971 |
| GB | 1383204 | 2/1975 |

* cited by examiner

*Primary Examiner*—Karl Group
*Assistant Examiner*—Elizabeth A. Bolden
(74) *Attorney, Agent, or Firm*—Nils H. Ljungman & Associates

(57) ABSTRACT

This invention relates to a flat float glass that can be prestressed or transformed into a glass ceramic with high quartz mixed crystals or keatite mixed crystals. To eliminate undesirable surface defects during floating and to achieve superior characteristics of the glass or of he glass ceramic, in particular with regard to a low coefficient of thermal expansion and high light transmittance, the glass has a concentration of less than 300 ppb Pt, less than 30 ppb Rh, less than 1.5 wt. % ZnO and less than 1 wt. % $SnO_2$, and is refined during melting without the use of the conventional fining agents arsenic oxide and/or antimony oxide.

20 Claims, No Drawings

FLAT FLOAT GLASS

BACKGROUND OF THE INVENTION

1. Field of the Invention

This invention relates to a flat float glass that can be prestressed or transformed into a glass ceramic with high quartz mixed crystals or keatite mixed crystals.

2. Background of the Invention

Numerous applications of glass require flat glass, e.g. glass in the form of glass sheets or panels to be used as view windows and for display purposes. These flat glass items are manufactured from molten glass using methods of the prior art such as rolling, drawing, casting and floating.

On account of high surface quality requirements, special importance has been acquired by float glass, which is widely used in the glass industry. In the manufacture of glass sheets using the float glass method, a ribbon of glass is drawn from the glass-melting furnace and then, to smooth the surface, the glass, while still deformable, is drawn over a metal bath (e.g. consisting of molten tin). The glass thereby "floats" on the liquid metal. After it is removed from the metal bath, the glass sheet is cooled and then cut to length into individual segments. The result is a flat glass that has parallel and fire-polished surfaces and a high surface quality.

Using the float glass method, flat glass can be manufactured from different glass materials. For example, the prior art describes the use of the float process to manufacture mirror glass, such as borosilicate glass or aluminosilicate glass, for example, in addition to conventional soda lime glass.

Soda lime glasses are defined as glass that is manufactured essentially from the raw materials silicon dioxide ($SiO_2$), lime ($CaCO_3$) and soda ($Na_2CO_3$). Soda lime float glass can thereby also be thermally prestressed and thus meets the requirements for safety glass. To achieve this thermal prestress, the prior art describes the heating of cut-to-length sheets of float glass to approximately 600° to 700° C., followed by a very rapid cooling by a current of cold air. As a result of this heating and rapid cooling process, strong compression stresses are induced in the surface of the glass, along with tensile stresses in the interior of the glass. This combination of stresses results in a significant increase in the bending tensile strength of the glass, a lack of sensitivity to rapid temperature fluctuations and high elasticity. When extremely severe loads are applied, this type of prestressed glass breaks into a plurality of pellet-like pieces that do not have very jagged edges. Soda lime float glass is therefore used widely, e.g. in architectural glazing or as curved windows for glazing automobiles.

Soda lime glass can also be chemically prestressed.

In chemical prestressing, the compression stress in the surface of the glass is achieved by ion exchange. Larger-radius ions that penetrate into the glass from outside thereby replace smaller ions. As a result of the greater amount of space occupied by the penetrating ions, a high compression stress is achieved in the surface, which increases the strength of the glass by a factor of 5 to 8.

The ion exchange is generally performed using alkali atoms, either in fused salts or by means of applied pastes. One conventional treatment uses potassium atoms that replace sodium atoms in the glass. One essential requirement is that the treatment take place below the transformation temperature of the glass, because otherwise the compression stress decreases significantly because of the heat. Chemically hardened glass of this type is used for special applications, such as in the aviation and aerospace industries, for centrifuge glass and in the lighting sector.

Borosilicate glass is a silicate glass that contains between 7% and 15% boron oxide. On account of its composition, it has a high temperature resistance and a very high hydrolytic and acid resistance. Like soda lime glass, it can be floated and thermally prestressed and is fined during manufacture using NaCl. Borosilicate float glass is therefore used in applications that require increased chemical resistance and increased temperature stability, or heat resistance.

Aluminosilicate glass is a silicate glass that has as its essential component aluminum trioxide as well as other oxides. This category includes glass from the $LiO_2$—$Al_2O_3$—$SiO_2$ system. A glass of this type can also be floated and thermally prestressed, and can be fined with $SnO_2$, for example. Aluminosilicate float glass also has an improved chemical resistance and higher temperature stability, and also has the advantage that it is free of alkali components, which makes it suitable for use as a substrate glass in display technologies.

It is generally known that aluminosilicate glass from the $LiO_2$—$Al_2O_3$—$SiO_2$ system can be converted into glass ceramics with high quartz mixed crystals or keatite mixed crystals as the principal crystal phases. Glass ceramic therefore consists of a crystal phase and a residual glass phase. The initial glass is obtained by normal glass manufacturing methods. After melting and fining, the glass conventionally undergoes a hot forming by rolling, casting or pressing. Then the glass is subjected to a heat treatment, as a result of which the glass is partly transformed under controlled conditions into a fine-grain crystal phase.

A key characteristic of these glass ceramics is that they can be used to manufacture materials that, in the temperature region of room temperature to about 700° C., have an extremely low coefficient of thermal expansion $\alpha_{20/700}<1.5\times 10^{-6}/K$. These glass ceramics are therefore used in transparent form, for example for fireproof glass, as view windows in stoves and furnaces or as cookware, as well as for substrate material for wafer stages or mirrors for telescopes. The transparent glass ceramics can be colored dark by the addition of colored oxides. This dark coloration is desirable, for example, when the glass is used as a cooking surface, to conceal the technical components that are installed underneath the cooking surface.

In the large-scale industrial manufacture of glass ceramics, arsenic oxide and/or antimony oxide are generally used as fining agents. These fining agents are compatible with the required glass ceramic characteristics and result in good seed, or bubble, qualities or low numbers of seeds, or bubbles, in the melt. Even if these substances are incorporated into the structure of the glass, they have disadvantages from the point of view of safety and environmental protection, because special precautionary measures have to be taken during the production and preparation of the raw material on account of evaporation from the melt, as well as during post-processing, recycling and disposal.

It is known that the manufacture of glass ceramic products occurs in different stages. After the melting and the hot forming, the material is conventionally cooled to below the transformation temperature of the glass. The initial glass is then converted by controlled crystallization into the glass ceramic article. This ceramization takes place in a two-stage temperature process, in which first, by nucleus formation, at a temperature between 600° C. and 800° C. nuclei are generated, conventionally from $ZrO_2$—$TiO_2$ mixed crystals.

During the subsequent temperature increase, the high-quartz mixed crystals form on these nuclei at the crystallization temperature of approximately 800 to 900° C. The transformation into the keatite mixed crystals takes place in a temperature region from about 900° C. to 1200° C. As a rule, glass ceramics with keatite mixed crystals as the principal phases are translucent or opaque with a white color and a slightly higher coefficient of thermal expansion than glass ceramics that have high quartz mixed crystals as the principal phase.

To simplify the manufacture of such glass ceramics with an initial float glass, attempts have been made, as described in U.S. Pat. No. 3,804,608, for example, to perform the ceramization as early as in the float bath, to thereby obtain the glass ceramics directly during the float process. However, a temperature gradient over the thickness of the glass strip is produced by the hot float bath and the cold top surface of the glass, which results in crystals that grow aspherically perpendicular to the surface. As a result of the crystallization during the float process, a number of disruptive mechanical and magnetic anisotropies of characteristics are generated.

GB 1 383 201 further describes the floating of $Li_2O$—$Al_2O_3$—$SiO_2$ glass ceramics with $TiO_2$, $ZrO_2$ or $P_2O_5$ as nucleation agents, which are crystallized by the temperature control during the floating on the molten unwetted metal (tin). This publication describes the necessary temperature control in the float, namely first a rapid cooling followed by a temperature increase, to first perform nucleus formation and then crystallization. In the float, to achieve the high heating and cooling rates, vertical separations extend from the ceiling of the float bath to just above the glass, to separate different temperature zones like individual compartments. The different zones are heated in the tin bath and above the glass strip. Because this publication relates primarily to the manufacture of the floated glass ceramic and not to the unceramized glass that is poured onto the float bath as such, this prior art publication contains no reference to any undesirable surface defects in the glass during the floating. Because the teaching of this prior art patent is limited to the crystallization of the glass that is still in the float, the problem of the formation of undesirable crystals in the glass is not discussed. During the manufacture of float glass from the $Li_2O$—$Al_2O_3$—$SiO_2$ system, however, disruptive surface defects occur in the glass and have an adverse effect on the surface quality, as will be described in greater detail below. On account of the economic advantages that can be achieved, moreover, it is also necessary with a glass composition in the $Li_2O$—$Al_2O_3$—$SiO_2$ system to manufacture thermally prestressed glass and to realize applications based on it. However, this type of manufacture is not possible with the glass ceramic product described in the above referenced GB patent.

OBJECT OF THE INVENTION

The object of the invention is to provide flat float glass that can be prestressed or transformed into a glass ceramic with high quartz mixed crystals or keatite mixed crystals as the principal crystal phase, which glass:

has no or minimal surface defects that interfere with the use of the glass and occur during floating as a result of interaction between the molten glass and the molten metal, can be manufactured with a high degree of light transmittance without any or minimal undesirable coloration, or discoloration, has a high temperature stability after thermal prestressing, has the required seed quality, or low number of bubbles, without the conventional fining agents such as arsenic oxide and/or antimony oxide, and which during the transformation to the crystal phase results in a glass ceramic that has the high surface quality of float glass and a very low coefficient of thermal expansion, and can be manufactured as glass ceramics in various realizations, transparent with a high light transmittance, translucent, opaque and even colored by the addition of coloring components.

SUMMARY OF THE INVENTION

The invention teaches that this object is accomplished by a flat float glass that can be prestressed or transformed into, a glass ceramic with high quartz mixed crystals or keatite mixed crystals, that has a concentration of less than 300 ppb Pt, less than 30 ppb Rh, less than 1.5 wt. % ZnO and less than 1 wt. % $SnO_2$ to prevent undesirable surface defects during floating, and that is refined during melting without the use of the conventional fining agents arsenic oxide and/or antimony oxide.

In the flat float class claimed by the invention that can be prestressed or transformed into a glass ceramic with high quartz mixed crystals or keatite mixed crystals as the principal crystal phase, the formation of disruptive surface defects during the floating is avoided by restricting the concentration of Pt to <300 ppb, Rh to <30 ppb and ZnO to <1.5 wt. % and $SnO_2$ to <1 wt. %.

During melting, the glass is fined without the use of the conventional fining agents arsenic oxide or antimony oxide and the flat glass is shaped by pouring it onto a molten metal in a reducing atmosphere, i.e. using the conventional float method.

These types of glass are therefore characterized by a composition that makes it possible to prevent the formation of undesirable surface defects during floating. Floats conventionally consist of the melting furnace, or hot end, in which the glass is melted and fined, or refined, an interface that provides the transition from the oxide atmosphere in the melting chamber into the reducing atmosphere in the rest of the system, and the float portion, in which the glass is shaped by pouring it onto a molten metal, generally Sn, in a reducing atmosphere of forming gas. The glass is formed by allowing it to flow out smoothly onto the Sn bath and by top rollers that exert a force on the surface of the glass. During the transport on the metal bath, the glass cools, and at the end of the float portion it is lifted off and transferred into a cooling furnace, or lehr, annealing furnace/oven. During the formation of the glass surface and the transport in the float, the interactions that are explained below between the glass and the float atmosphere or the Sn batch can result in undesirable surface defects.

If the glass contains more than 300 ppb Pt or more than 30 ppb Rh in dissolved form, metallic precipitations of Pt or Rh particles can form in the glass surface as a result of the reducing conditions, and these particles can serve as effective nucleation agents for large high quartz, or beta quartz, mixed crystals up to 100 μm, and thus cause undesirable surface crystallization. These materials are used in, among other things, electrodes, linings, agitators, transport tubes, valve gates etc. Therefore, to prevent the formation of surface crystals in plants for the performance of the method for the manufacture of the glass ceramic described above, components that contain Pt or Rh are completely avoided, and/or are replaced by ceramic materials, or the conditions in the melting chamber or interface are controlled so that the above-mentioned concentrations are not exceeded.

The ZnO concentration is restricted to 1.5 wt. %. It has been shown that under the reducing conditions in the float, the zinc is depleted in the surface of the glass. It is thereby assumed that the zinc is partly reduced on the surface of the glass, whereupon it vaporizes as a result of the higher vapor pressure of Zn compared to $Zn^{2+}$ in the float atmosphere. In addition to the evaporation and deposition of the Zn in colder spots, which are undesirable for the operation of the float, the uneven distribution of the Zn in the glass is a contributing factor in the origin of critical crystal bands close to the surface. These crystal bands of large high, or beta, quartz mixed crystals originate in the vicinity of the surface where the Zn concentration in the glass has risen back close to the initial value. The crystal band therefore forms by interaction with the reducing effect of the float atmosphere on polyvalent glass components, such as from a partial reduction of the $Ti^{4+}$ to $Ti^{3+}$, for example. It is therefore appropriate to keep the initial value of ZnO in the glass low from the start.

The concentration of $SnO_2$ in the glass is restricted to less than 1 wt. %. As a result of the action of the reducing conditions in the float portion, the $SnO_2$ is partly reduced, especially in the surface of the glass. Surprisingly, small metal Sn spheres having a size of about 100 nm form in the glass in the immediate surface of the glass, and although they can easily be removed during cooling or cleaning, they leave behind spherical holes, or pits, depressions, that are extremely undesirable for the intended use of the glass. These small spheres can be prevented if the concentration of $SnO_2$ is very low.

The above mentioned primary glasses are fined, or refined, without using the fining agents arsenic oxide and/or antimony oxide which are conventionally used to manufacture glass from the $Li_2O$—$Al_2O_3$—$SiO_2$ system. Under the action of the reducing conditions during floating, the above mentioned fining agents in particular are reduced directly on the surface of the glass and form undesirable and visible metallic coatings. The removal of these coatings, which are aesthetically and toxicologically undesirable, requires grinding and polishing and is disadvantageous for economic reasons. To prevent the formation of the coatings, it is therefore appropriate to achieve a low seed number, or number of seeds, number of bubbles, by adding at least one alternative chemical fining agent, such as $SnO_2$, $CeO_2$, sulfate compounds and/or chloride compounds, for example, preferably 0.2–0.6 wt. % $SnO_2$, to the molten glass. Alternatively, the molten glass can also be fined physically, e.g. by means of underpressure or by means of high temperature >1750°. Thus the required seed quality, or number of bubbles, can be achieved by means of alternative fining agents and/or alternative fining methods.

When there are particularly high requirements for the bubble, or seed, quality, it may be necessary to combine chemical fining and physical fining methods.

The oxides $Li_2O$, $Al_2O_3$ and $SiO_2$ in the preferred limits indicated in the claims are necessary components in the high quartz and keatite mixed crystal phase for the transformation of the glass into glass ceramic. MgO, ZnO and $P_2O_5$ can be incorporated as additional components. $Li_2O$ concentrations of more than 5 wt. % increase the crystal growth rate and result in an undesirable devitrification during the manufacturing process. Because the ZnO concentration is restricted to less than 1.5 wt. % and preferably less than 1 wt. % on account of the problem of evaporation described above and the formation of a crystal band, at least 0.1 wt. % and preferably at least 0.3 wt. % MgO are necessary, so that in addition to the $Li_2O$, an additional component can be used for charge compensation for the Al incorporated into the crystal instead of the Si. Higher concentrations of MgO than 2.2 wt. % result in an unacceptable increase in the coefficient of thermal expansion of the glass ceramic. To prevent high viscosities of the glass and a tendency to undesired crystallization of mullite, the $Al_2O_3$ concentration is restricted to 25 wt. %. The $SiO_2$ concentration is limited to a maximum of 69 wt. %, because higher concentrations of these components sharply increase the viscosity of the glass and are thus unacceptable for the melting of the glass and with regard to the temperature stability of the float. The addition of the alkalis $Na_2O$, $K_2O$ and the earth alkalis CaO, SrO and BaO of course improve the meltability, or fusability, refractoriness, and the devitrification action of the glass during floating. The concentrations are limited, however, because these components essentially remain in the residual glass phase of the glass ceramic and unacceptably increase the thermal expansion. Higher concentrations can also have an adverse effect on the crystallization behavior. The sum of the alkalis $Na_2O$ and $K_2O$ should be at least 0.2 wt. % and preferably at least 0.4 wt. %. The addition of $P_2O_5$ can be up to 3 wt. % and is favorable for the suppression of the undesirable mullite crystallization. The concentration should be less than 3.0 wt. %, and preferably less than 2 wt. %, because $P_2O$, has an undesirable effect on acid resistance. The concentrations of the nucleation agent components $TiO_2$, $ZrO_2$ and $SnO_2$ must be controlled within relatively narrow limits. On the one hand, minimum concentrations of 2.5 wt. %, and preferably 3.0 wt. % are necessary to generate nuclei in high density during the nucleation, so that transparent glass ceramics can be realized after the high quartz mixed crystals have grown. As a result of the high nuclear density, the average crystallite size of the high quartz mixed crystals remains limited to <100 nm, as a result of which undesirable light scatter is prevented. Higher nucleation agent concentrations than 5.0 wt. %, however, under the time/temperature conditions of the float, already result in undesirable surface crystals in contact between the glass and the tin bath. If a coloring of the glass or glass ceramic materials is desired, conventional coloring components such as vanadium, chromium, manganese, iron, cobalt, copper, nickel, selenium and/or chloride compounds can be added to the glass during fusion.

The water content of the glass claimed by the invention depends on the selection of the raw materials and on the process conditions during the fusion and is conventionally between 0.01 and 0.06 Mol/liter.

The glass claimed by the invention, in a first embodiment, thereby has a composition in per cent by weight on an oxide basis of:

| | |
|---|---|
| $Li_2O$ | 3.2–5.0 |
| $Na_2O$ | 0–1.5 |
| $K_2O$ | 0–1.5 |
| $\Sigma Na_2O + K_2O$ | 0.2–2.0 |
| MgO | 0.1–2.2 |
| CaO | 0–1.5 |
| SrO | 0–1.5 |
| BaO | 0–2.5 |
| ZnO | 0–<1.5 |
| $Al_2O_3$ | 19–25 |
| $SiO_2$ | 55–69 |
| $TiO_2$ | 1.0–5.0 |

-continued

|  |  |
|---|---|
| $ZrO_2$ | 1.0–2.5 |
| $SnO_2$ | 0–<1.0 |
| $\Sigma TiO_2 + ZrO_2 + SnO_2$ | 2.5–5.0 |
| $P_2O_5$ | 0–3.0 |

In a second embodiment, the glass in one particularly preferred embodiment has a composition, in wt. % on an oxide basis, of:

|  |  |
|---|---|
| $Li_2O$ | 3.5–4.5 |
| $Na_2O$ | 0.2–1.0 |
| $K_2O$ | 0–0.8 |
| $\Sigma Na_2O + K_2O$ | 0.4–1.5 |
| MgO | 0.3–2.0 |
| CaO | 0–1.0 |
| SrO | 0–1.0 |
| BaO | 0–2.5 |
| ZnO | 0–1.0 |
| $Al_2O_3$ | 19–24 |
| $SiO_2$ | 60–68 |
| $TiO_2$ | 1.0–2.0 |
| $ZrO_2$ | 1.2–2.2 |
| $SnO_2$ | 0–0.6 |
| $\Sigma TiO_2 + ZrO_2 + SnO_2$ | 3.0–4.5 |
| $P_2O_5$ | 0–2.0. |

In other words, the glass claimed by the invention, in a first embodiment, thereby has a composition in per cent by weight on an oxide basis of: $Li_2O$: 3.2–5.0 percent, $Na_2O$: 0–1.5 percent, $K_2O$: 0–1.5 percent, $\Sigma$ $Na_2O+K_2O$: 0.2–2.0 percent, MgO: 0.1–2.2 percent, CaO: 0–1.5 percent, SrO: 0–1.5 percent, BaO: 0–2.5 percent, ZnO: 0–<1.5 percent, $Al_2O_3$: 19–25 percent, $SiO_2$: 55–69 percent, $TiO_2$: 1.0–5.0 percent, $ZrO_2$: 1.0–2.5 percent, $SnO_2$: 0–<1.0 percent, $\Sigma$ $TiO_2+ZrO_2+SnO_2$: 2.5–5.0 percent, and $P_2O_5$: 0–3.0 percent.

In the second embodiment, the glass in one particularly preferred embodiment has a composition, in wt. % on an oxide basis, of: $Li_2O$: 3.5–4.5 percent, $Na_2O$: 0.2–1.0 percent, $K_2O$: 0–0.8 percent, $\Sigma$ $Na_2O+K_2O$: 0.4–1.5 percent, MgO: 0.3–2.0 percent, CaO: 0–1.0 percent, SrO: 0–1.0 percent, BaO: 0–2.5 percent, ZnO: 0–1.0 percent, $Al_2O_3$: 19–24 percent, $SiO_2$: 60–68 percent, $TiO_2$: 1.0–2.0 percent, $ZrO_2$: 1.2–2.2 percent, SnO: 0–0.6 percent, $\Sigma$ $TiO_2+ZrO_2+SnO_2$: 3.0–4.5 percent, and $P_2O_5$: 0–2.0 percent.

It has further been found to be advantageous that the glass compositions claimed by the invention can also be prestressed chemically, if the sum of the concentrations of $Li_2O$ and $Na_2O$ is greater than 3.5 wt. %. As a result of the comparatively high $Li_2O$ concentration, it is possible to produce high compression stresses in the glass surface by ion exchange with $Na_2O$, preferably with $K_2O$.

The crystal bands that are formed with the participation of the ZnO (as described) are also caused by the additional component $TiO_2$. It is assumed that in the vicinity of the surface there is a partial reduction of the titanium to the trivalent form $Ti^{3+}$ which, by interaction with the $Zn^{2+}$, above a certain minimum amount of zinc, causes the crystal bands. The harmful surface crystal band can be prevented in one realization of the invention if the expression (in wt. %) $3.2 \times ZnO+TiO_2<4.3$ is valid. It is also possible, by reducing the amount of $TiO_2$ added, to partly compensate for the harmful effect of the ZnO. The formation of the crystal band is reliably prevented in preferred compositions that contain no ZnO.

The particular economic advantage of the glass composition range described above is that using the same composition, both thermally and chemically prestressable glass and glass ceramics with low coefficients of thermal expansion can be manufactured.

Expensive and time-consuming remelting between different compositions can therefore be eliminated. The manufacturing logistics are also simplified in terms of the quantities of raw materials and cullet that have to be kept in inventory. The glass in inventory can be processed to make the different products on the basis of market demand.

For the use of the glass, e.g. as thermally prestressed fireproof glass, a high light transmittance is typically required. Any coloration in the vitrified state that interferes with the transmission of light must be avoided. For example, the applicable EN standard for the use of fireproof glass in construction requires a light transmittance for a 4 mm thickness of >90%. It has been shown that the required light transmittance of >89%, preferably >90%, can be achieved in one embodiment of the invention by concentrations of less than 200 pm $Fe_2O_3$, and less than 2.5 wt. % $TiO_2$ in the glass.

The environmental concerns that relate to the chemical fining agents arsenic oxide and antimony oxide also apply to barium oxide, although to a lesser extent. Raw materials that contain barium, in particular if they are water-soluble such as barium chloride and barium nitrate, for example, are toxic and require special precautionary measures during use and handling. In the glass compositions claimed by the invention, it is advantageously possible to eliminate the use of BaO, except for technically unavoidable trace amounts.

During the transformation of the initial glass claimed by the invention into glass ceramics with high quartz or keatite mixed crystals as the principal crystal phase, it is therefore possible to take advantage of the high surface quality achieved during floating for glass ceramics, too, instead of the conventional rolling. Shaping by means of the float has the additional advantage over rolling that larger strip widths are possible, and the thickness can be adjusted more quickly and within wider limits.

The glass claimed by the invention is typically characterized by a coefficient of thermal expansion $\alpha_{20/300}$ between 3.5 and $5.0 \times 10^{-6}$/K. If the coefficient of thermal expansion is less than $3.5 \times 10^{-6}$/K, it is difficult to achieve sufficient prestress using conventional air prestressing systems for the breaking into pellet-like pieces required by DIN 1249. A thermal prestressing, for example, by immersion in oil-coated water, is described by the prior art, but it is technically more complex and is significantly more expensive than quenching with air in conventional air prestressing systems. To achieve a high thermal shock resistance, the coefficient of thermal expansion $\alpha_{20/300}$ should be no greater than $5.0 \times 10^{-6}$/K. The transformation temperature Tg of the float glass should be between 600 and 750° C. Such high transformation temperatures in comparison to conventional soda lime glass are positive for the achievement of a high prestressing and thus a high thermal shock resistance. The transformation temperature should not exceed 750° C., because otherwise there is a risk that in the event of a fire, the fireproof glazing will be destroyed by the warping steel frames, because the glass is not soft enough to absorb the thermal stresses. Moreover, the air prestressing system required for higher transformation temperatures is significantly more complex. The processing temperature $V_A$ is less than 1350° C. (to limit the thermal load on the float bath and the evaporation of Sn).

In one preferred embodiment of the invention, the glass is characterized by a coefficient of thermal expansion $\alpha_{20/700}$ after transformation into the transparent glass ceramic with high quartz mixed crystals as the predominant crystal phase that differs by not more than 0.5, and preferably by less than $0.15 \times 10^{-6}$/K from zero expansion, to achieve high thermal shock resistance.

For glass ceramic materials in transparent form, e.g. for use as windows in furnaces, stoves and ovens, the concentrations should be $TiO_2 < 2$ wt. %, $SnO_2 < 0.5$ wt. % and $Fe_2O_3 < 200$ ppm, so that a light transmittance of >80% at a thickness of 4 mm can be achieved.

On transparent, translucent or opaque glass ceramics, the desired colors are achieved by the addition of the coloring compounds individually or together. In this case, even small additions will frequently suffice.

In colored form for use as a cooking surface, a light transmittance of <5% at a 4 mm thickness can be achieved by coloring with V, Cr, Mn, Fe, Co, Cu, Ni, Se and/or Cl compounds. Coloring with V compounds has advantages when the glass ceramic is used for cooking surfaces, because the coloring in the visible range can be combined with a favorable high transmittance in the infrared range.

When the glass is transformed into glass ceramic with keatite mixed crystals as the predominant crystal phase, the coefficient of thermal expansion should be less than $1.5 \times 10^{-6}$/K. Such glass ceramics can be transparent, white translucent or white opaque, depending on the composition. when coloring oxides are used, the white color is correspondingly over-dyed, or cross-dyed, over-colored.

If a coating on the glass is desired, it is economically advantageous to utilize the residual heat of the glass from the shaping process and to perform the coating in the float and/or before the cooling of the glass. In this manner, one or more coats of $SiO_2$, $TiO_2$, $SnO_2$, $Al_2O_3$, $WO_3$, $VO_2$ or conductive indium/tin oxide coatings can be applied.

The glass is melted in a melting furnace in a conventional atmosphere containing oxygen from raw materials that are conventional in the glass industry, and subjected to a fining process to eliminate the bubbles. The melt flows through a block with a flow opening and through an interface that keeps it away from the atmosphere that contains the oxygen. In the interface the melt is agitated and transported via a trough into the float, which has a reducing atmosphere. The glass melt flows over a spout lip at a viscosity in the neighborhood of the processing temperature $V_A$ and is poured onto the molten tin. It is essential that the temperature at the spout lip be higher than the devitrification temperature of the melt, to prevent a premature and uncontrolled devitrification of the melt, which is achieved constructively by heaters in or around the spout lip. After the melt contacts the molten metal it is shaped and cooled, and at the end of the float, the glass is then removed at temperatures that are slightly above the transformation temperature and is annealed in a cooling furnace. There is an on-line quality control, after which the glass is cut and stacked in the desired formats.

The flat float glass claimed by the invention can be used preferably both as thermally prestressable glass and, after conversion into a glass ceramic with high quartz mixed crystals or keatite mixed crystals as the principal crystal phase, as a glass ceramic claimed by the invention with a low coefficient of thermal expansion. The thermally prestressable glass is used preferably as thermally prestressed fireproof glass with safety glass characteristics in accordance with DIN 1249 (breakage into pellets). The glass ceramic claimed by the invention is preferably used in transparent form as fireproof glass, for windows in furnaces and ovens, as covers for high-energy lights and as windows for pyrolysis ovens, and in dark colored form as heating plates for cooling and grilling. By applying a light-absorbing coating on the underside, transparent glass ceramics can be used to manufacture a cooking surface with the required light transmittance.

The glass ceramic products have esthetic advantages as a result of the higher surface quality that can be achieved by using the float process compared to conventional rolling. Undesirable reflections and distortions are eliminated. Transparent glass ceramic can be used as fireproof glass without the need for expensive polishing of the surface. When the glass ceramic is used in windows for furnaces, ovens or pyrolysis ovens and as a covering for high-energy lights, the surface produced by the float process is significantly less sensitive to the adherence of dirt and can be cleaned more easily than a rolled surface with its microroughness.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE TABLES

This invention is explained in further detail in the examples presented below.

Table 1 presents compositions and characteristics of different types of float glass for several exemplary embodiments. Examples 1 to 14 are types of glass as claimed by the invention and Examples 15 to 17 are comparative examples that are not part of this invention.

Table 2 presents the characteristics of the corresponding glass ceramics.

DESCRIPTION OF THE PREFERRED EMBODIMENT

The initial glasses in Table 1 were melted and fined using raw materials that are conventional in the glass industry. The $Fe_2O_3$ content of these glasses is 160 ppm. In Example 2, a level of 100 ppm $Fe_2O_3$ was achieved by using a pure $SiO_2$ raw material. The glass in Examples 1–16 was melted and fined in pots made of fused quartz, or silica glass, at temperatures of approximately 1620° C. Then the melts were transferred to a platinum/rhodium pot with an inner pot made of fused quartz to prevent direct contact with the platinum/rhodium, and homogenized at temperatures of approximately 1580° C. for 30 minutes. After dead-melting, or killing, at approximately 1640° C. for 1 hour, castings approximately 140×100×30 mm were poured and cooled from approximately 660° C. to room temperature in a cooling furnace, or lehr, annealing furnace. The test specimens, e.g. bars for measurement of the transformation temperature $T_g$ and of the coefficient of thermal expansion $\alpha_{20/300}$, were prepared from these castings. As a result of the avoidance of contact between the glass melt and the platinum/rhodium, the Pt content was 10–30 ppb, and the rhodium content was below the limit of detection, i.e. <10 ppb.

The compositions claimed by the invention were melted in a high-frequency heated 4 liter pot made of sintered fused quartz, or silica glass, at temperatures of approximately 1750° C. After the glass had been completely melted, it was fined for 1 hour at 1900–2000° C. This high-temperature fining produced castings that were very bubble-free. These castings were prepared for tests for pouring into a commercial float used to manufacture special glass. The castings were remelted in a 2 liter pot made of platinum/rhodium with a fused quartz inner pot. These pots were fastened to the front end of a suspension apparatus with a long rod. The suspension apparatus with the pot was introduced into the float via small openings. The melt in the pot was poured onto the molten tin at the beginning of the float, behind the spout lip, and as it was flowing it was attached to the production strip which consisted of borosilicate glass. The hold time of the poured glass on the float bath was approximately 30–40 minutes. The test melts were transported through the float and through the cooling furnace together with the borosilicate production strip. Behind the cooling furnace, the solidified test melts, which were approximately 4–6 mm thick, were cut off the production strip and removed for testing. As a result of the very similar coefficients of thermal expansion of borosilicate glass and the compositions claimed by the invention, the test melts also adhered to the borosilicate glass very well, and the test melts did not break off the production strip as a result of stresses caused by different coefficients of thermal expansion. The floated compositions claimed by the invention were measured for their light transmittance in accordance with DIN 5033. The floated test melts were also inspected on their upper and lower sides for glass defects, in particular for crystals. The upper side of the floated test melts was free of crystals. Only in isolated cases, when substances from the cover of the float bath fell onto the glass melt, were crystals formed by contact. On the underside of the floated test melts there were isolated but not visually unacceptable crystals. The origin of these crystals was traced to the penetration of small quantities of atmospheric oxygen into the float bath at the boundary between the test melts and the molten tin bath. The atmospheric oxygen that entered under the test conditions caused local oxidation of the Sn, which then diffused into the glass and acted as nucleation agents for the generation of local high quartz mixed crystals. The thermal prestressability of the glass and the transformation into glass ceramic were not adversely affected by the isolated crystals on the underside.

No precipitations of Pt and Rh in particular were found.

The very damaging crystal bands did not occur in the test melts with the glass compositions claimed by the invention.

Nor were any Sn drops found on the upper side of the floated test melts.

Comparative Example No. 15 shows a composition that was melted with $As_2O_3$ as the fining agent. Castings of this composition were poured into the float using the method described above and attached to the production strip. The float glass removed from the float showed metallic coatings, or stripes, of arsenic, which were formed by the reducing forming gas atmosphere of the float bath. In contrast to Comparative Example No. 15, Comparative Example No. 16 used the same basic composition but there was no addition of $As_2O_3$. After the glass was poured onto the float bath, the undesirable crystal band of high quartz mixed crystals was found on both sides near the surface. This glass has a composition with a high ZnO concentration and a relatively high $TiO_2$ concentration.

In Comparative Example 17, the composition from Example 16 was melted directly in a platinum/rhodium pot without the inner fused quartz pot. The platinum content of the molten castings was measured at 900 ppb. The float glass had dendritically grown surface crystals up to a size of 100 µm and adjacent droplet-shaped metallic crystallizations.

The transformation into the glass ceramic occurs under the nucleation and crystallization conditions listed in Table 2. Following a rapid heating to 600° C., the glass is heated to the nucleation temperature, and then from the nucleation temperature to the crystallization temperature at a uniform heating rate of 2.5 K/min. The glass is then cooled from the maximum temperature to approximately 600° C. at a cooling rate of approximately 4 K/min., followed by the deactivation of the furnace heater. Example 11 shows a glass ceramic that was transformed by an additional temperature increase to 1100° C. for 1 hour into a white translucent glass ceramic with keatite mixed crystals as the predominant crystal phase. The rest of the examples as claimed by the invention, as a result of their concentration of high quartz mixed crystals as the predominant crystal phase, have the desired very low values for thermal expansion, measured in the temperature range between room temperature and 700° C. The principal crystal phase and the average crystallite size were measured by means of X-ray diffractometry. The light transmittance was measured in accordance with DIN 5033.

One feature of the invention resides broadly in a flat float glass that can be prestressed or transformed into a glass ceramic with high quartz mixed crystals or keatite mixed crystals, that has a concentration of less than 300 ppb Pt, less than 30 ppb Rh, less than 1.5 wt. % ZnO and less than 1 wt. % $SnO_2$ to prevent undesirable surface defects during floating, and that is refined during melting without the use of the conventional fining agents arsenic oxide and/or antimony oxide.

Another feature of the invention resides broadly in a flat float glass characterized by a composition (in wt. % on an oxide basis) of: $Li_2O$: 3.2–5.0 percent, $Na_2O$ 0–1.5 percent, $K_2O$: 0–1.5 percent, Z $Na_2O+K_2O$: 0.2–2.0 percent, MgO: 0.1–2.2 percent, CaO: 0–1.5 percent, SrO: 0–1.5 percent, BaO: 0–2.5 percent, ZnO: 0–<1.5 percent, $Al_2O_3$: 19–25 percent, $SiO_2$: 55–69 percent, $TiO_2$: 1.0–5.0 percent, $ZrO_2$: 1.0–2.5 percent, SnO: 0–<1.0 percent, Σ $TiO_2+ZrO_2+SnO_2$: 2.5–5.0 percent, $P_2O_5$: 0–3.0 percent, optionally with the addition of coloring components such as V, Cr, Mn, Fe, Co, Cu, Ni, Se and/or Cl compounds.

Yet another feature of the invention resides broadly in a flat glass characterized by a composition (in wt. % on an oxide basis) of: $Li_2O$: 3.5–4.5 percent, $Na_2O$ : 0.2–1.0 percent, $K_2O$: 0–0.8 percent, Σ $Na_2O+K_2O$: 0.4–1.5 percent, MgO: 0.3–2.0 percent, CaO: 0–1.0 percent, SrO: 0–1.0 percent, BaO: 0–2.5 percent, ZnO: 0–1.0 percent, $Al_2O$: 19–24 percent, $SiO_2$: 60–68 percent, $TiO_2$: 1.0–2.0 percent, $ZrO_2$:1.2–2.2 percent, $SnO_2$: 0–0.6 percent, Σ $TiO_2+ZrO_2+SnO_2$: 3.0–4.5 percent, $P_2O_5$: 0–2.0, optionally with the addition of coloring components such as V, Cr, Mn, Fe, Co, Cu, Ni, Se and/or Cl compounds.

Still another feature of the invention resides broadly in a flat glass characterized by the fact that the sum $Li_2O$ +$Na_2O$>3.5 wt. % and the glass can therefore be chemically prestressed.

A further feature of the invention resides broadly in a flat glass characterized by the fact that to prevent the formation of an undesirable crystal band near the surface during floating, the following expression (in wt. %) is valid: 3.2× $ZnO+TiO_2$<4.3.

Another feature of the invention resides broadly in a flat glass characterized by concentrations of less than 200 ppm Fe$_2$O$_3$ and less than 2.5 wt. % TiO$_2$ to counteract undesired coloration in the vitrified state and to achieve a light transmittances at a thickness of 4 mm of >89% and preferably >90%.

Yet another feature of the invention resides broadly in a flat glass characterized by the fact that the glass is technically, or industrially, free of ZnO and BaO.

Still another feature of the invention resides broadly in a flat glass characterized by a coefficient of thermal expansion $\alpha_{20/300}$ between 3.5 and 5.0×10$^{-6}$/K, a transformation temperature Tg between 600 and 750° C. and a processing temperature V$_A$ below 1350° C.

A further feature of the invention resides broadly in a flat glass characterized by the fact that the glass ceramic manufactured by transformation has a transparent, translucent or opaque appearance, and has an additional color when coloring components are added.

Another feature of the invention resides broadly in a flat glass characterized by a coefficient of thermal expansion $\alpha_{20/700}$ after transformation into the glass ceramic with keatite mixed crystals as the predominant crystal phase of less than 1.5×10$^{-6}$/K.

Yet another feature of the invention resides broadly in a flat glass characterized by a coefficient of thermal expansion $\alpha_{20/700}$ after transformation into the glass ceramic with high quartz mixed crystals as the predominant crystal phase of (0±0.5)×10$^{-6}$/K, preferably (0±15)×10$^{-6}$/K.

Still another feature of the invention resides broadly in a flat glass characterized by the fact that the transparent glass ceramic, to achieve a light transmittance at 4 mm thickness of >80%, contains less than 2 wt. % TiO$_2$, less than 0.5 wt. % SnO$_2$ and less than 200 ppm Fe$_2$O$_3$.

A further feature of the invention resides broadly in a flat glass characterized by the fact that the glass ceramic is colored with V, Cr, Mu, or Mn, Fe, Co and/or Ni compounds with a light transmittance of <5% at a thickness of 4 mm.

Another feature of the invention resides broadly in a flat glass as claimed characterized by the fact that to achieve a low number of bubbles, or seeds, at least one alternative chemical fining agent such as SnO$_2$, CeO$_2$, sulfate compounds, chloride compounds for example, preferably 0.2–0.6 wt. % SnO$_2$ is added to the glass melt.

Yet another feature of the invention resides broadly in a flat glass characterized by the fact that to achieve a low number of bubbles, the glass melt is physically fined, e.g. by under pressure or by means of high temperature >1750° C.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. DE 100 17 701.8-45, filed on April 8, 2000, having inventors Dr. Friedrich SIEBERS, Dr. Peter NASS, Dr. Gerhard IAUTENSCHLÄGER, Dr. Otmar BECKER, entitled "Glas sowie Verfahren zu seiner Herstellung und Verwendung desselben," and DE-OS 100 17 701.8-45 and DE-PS 100 17 701.8-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Another foreign patent publication application, namely, Federal Republic of Germany Patent Application No. DE 100 17 698.4-45, filed on Apr. 8, 2000, having inventors Dr. Sabine MELSON, Dr. K. SCHAUPERT, and Dr. Peter NASS, entitled, "Reinigungsfreundlicher Glaskeramikkörper," and DE-OS 100 17 698.4-45 and DE-PS 100 17 698.4-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Yet another foreign patent publication application, namely, Federal Republic of Germany Patent Application No. DE 100 17 699.2-45, filed on Apr. 8, 2000, having inventors Dr. Sabine MELSON and Stefan HUBERT, entitled "Verglasung von gegenüber der Umgebung im Weltraum oder in Polarregionen abgekapselten Räumen," and DE-OS 100 17 699.2-45 and DE-PS 100 17 699.2-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

A further foreign patent publication application, namely, Federal Republic of Germany Patent Application No. DE 100 17 696.8-33, filed on Apr. 8, 2000, having inventors Dr. Sabine MELSON and Dr. Peter NASS, entitled, "Transparente Abdeckung der Strahlungsquelle von Lampen," and DE-OS 100 17 696.8-33 and DE-PS 100 17 696.8-33, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

U.S. Pat. No. 6,492,622 having attorney docket No. NHL-FMW-01 US (SCT), having inventors Dr. Sabine MELSON, Dr. K. SCHAUPERT, and Dr. Peter NAsS, issued on Dec. 12. 2002, claiming priority from Federal Republic of Germany Patent Application No. DE 100 17 698.4-45, filed on Apr. 8, 2000, having inventors Dr. Sabine MELSON, Dr. K. SCHAUPERT, and Dr. Peter NASS, entitled, "Reinigungsfreundlicher GIaskeramikkörper," is hereby incorporated by reference as if set forth in its entirety herein.

U.S. patent application Ser. No. 09/828,287 having attorney docket No. NHL-FMW-03 US (SCT), having inventors Dr. Sabine MELSON and Stefan HUBERT, filed on Apr. 6, 2001, claiming priority from Federal Republic of Germany Patent Application No. DE 100 17 699.2-45, filed on Apr. 8, 2002, having inventors Dr. Sabine MELSON and Stefan HUBERT, entitled "Verglasung von gegenüber cier Umgebung im Weltraum oder in Polarregionen abgekapserten Räumen," is hereby incorporated by reference as if set forth in its entirety herein.

U.S. patent application No. 09/828,286 having attorney docket No. NHL-FMW-04 US (SCT), having inventors Dr. Sabine MELSON and Dr. Peter NASS, filed on Apr. 6, 2001, claiming priority from Federal Republic of Germany Patent Application No. DE 100 17 696.8-33, filed on Apr. 8, 2000, having inventors Dr. Sabine MELSON and Dr. Peter NAβ, entitled, "Transparente Abdeckung der Strahlungsquelle von Lampen," is hereby incorporated by reference as if set forth in its entirety herein.

U.S. Pat. No. 3,804,608 issued to Gaskell et al. on Apr. 16, 1974 and entitled "Method for making glass ceramic materials"; and U.S. Pat. No. 3,809,543 issued to Gaskell et al. on May 7, 1974 and entitled "Method of making glass ceramic materials on molten metal support, which corresponds, inter alia, to GB Patent No. 1,383,201, are hereby incorporated by reference as if set forth in their entirety herein.

The term DIN refers to the standards of the German Standards Association, Deutsches Institut für Normung.

The term EN refers to European standards.

The expression thermal expansion coefficient or coefficient of thermal expansion ($\alpha_{20/300}$) in at least one embodiment of the invention is to mean: a thermal coefficient ($\alpha$) as possibly nominally applicable in the temperature range of nominal from about 20 to about 300 (in the Celsius and/or Kelvin scale, as possibly applicable) in the context of the indicated data.

The expression glass transition temperature or transformation temperature ($T_g$) in at least one embodiment of the invention is to mean: (1): the temperature below which a substance becomes superconducting; or (2) the temperature at which one polymorph changes into the next thermodynamically stable state; as the shown technical data suggest.

In accordance with one possible embodiment the glass composition comprises in weight percent based on oxide: $Li_2O$ three point two to five point zero percent and within the range percentages in tenth of percent steps such that any tenth of a percent may be a limit of a diminished range; $Na_2O$ zero to one point five percent and within the range percentages in tenth of percent steps such that any tenth of a percent may be a limit of a diminished range; $K_2O$ zero to one point five percent and within the range percentages in tenth of percent steps such that any tenth of a percent may be a limit of a diminished range; $\Sigma Na_2O+K_2O$ point two to two point zero percent and within the range percentages in tenth of percent steps such that any tenth of a percent may be a limit of a diminished range; MgO point one to two point two percent and within the range percentages in tenth of percent steps such that any tenth of a percent may be a limit of a diminished range; CaO zero to one point five percent and within the range percentages in tenth of percent steps such that any tenth of a percent may be a limit of a diminished range; SrO zero to one point five percent and within the range percentages in tenth of percent steps such that any tenth of a percent may be a limit of a diminished range; BaO zero to two point five percent and within the range percentages in tenth of percent steps such that any tenth of a percent may be a limit of a diminished range; ZnO zero to less than one point five percent and within the range percentages in tenth of percent steps such that any tenth of a percent may be a limit of a diminished range; $Al_2O_3$ nineteen to twenty-five percent and within the range percentages in tenth of percent steps such that any tenth of a percent may be a limit of a diminished range; $SiO_2$ fifty-five to sixty-nine percent and within the range percentages in tenth of percent steps such that any tenth of a percent may be a limit of a diminished range; $TiO_2$ one point zero to five point zero percent and within the range percentages in tenth of percent steps such that any tenth of a percent may be a limit of a diminished range; $ZrO_2$ one point zero to two point five percent and within the range percentages in tenth of percent steps such that any tenth of a percent may be a limit of a diminished range; $SnO_2$ zero to less than one point zero percent and within the range percentages in tenth of percent steps such that any tenth of a percent may be a limit of a diminished range; $\Sigma TiO_2+ZrO_2+SnO_2$ two point five to five point zero percent and within the range percentages in tenth of percent steps such that any tenth of a percent may be a limit of a diminished range; $P_2O_5$ zero to three point zero percent and within the range percentages in tenth of percent steps such that any tenth of a percent may be a limit of a diminished range.

In another embodiment, the glass may possible comprise: $Li_2O$ three point five to four point five percent and within the range percentages in tenth of percent steps such that any tenth of a percent may be a limit of a diminished range; $Na_2O$ point two to one point zero percent and within the range percentages in tenth of percent steps such that any tenth of a percent may be a limit of a diminished range; $K_2O$ zero to point eight percent and within the range percentages in tenth of percent steps such that any tenth of a percent may be a limit of a diminished range; $\Sigma Na_2O+K_2O$ point four to one point five percent and within the range percentages in tenth of percent steps such that any tenth of a percent may be a limit of a diminished range; MgO point three to two point zero percent and within the range percentages in tenth of percent steps such that any tenth of a percent may be a limit of a diminished range; CaO zero to one point zero percent and within the range percentages in tenth of percent steps such that any tenth of a percent may be a limit of a diminished range; SrO zero to one point zero percent and within the range percentages in tenth of percent steps such that any tenth of a percent may be a limit of a diminished range; BaO zero to two point five percent and within the range percentages in tenth of percent steps such that any tenth of a percent may be a limit of a diminished range; ZnO zero to one point zero percent and within the range percentages in tenth of percent steps such that any tenth of a percent may be a limit of a diminished range; $Al_2O_3$ nineteen to twenty-four percent and within the range percentages in tenth of percent steps such that any tenth of a percent may be a limit of a diminished range; $SiO_2$ sixty to sixty-eight percent and within the range percentages in tenth of percent steps such that any tenth of a percent may be a limit of a diminished range; $TiO_2$ one point zero to two point zero percent and within the range percentages in tenth of percent steps such that any tenth of a percent may be a limit of a diminished range; $ZrO_2$ one point two to two point two percent and within the range percentages in tenth of percent steps such that any tenth of a percent may be a limit of a diminished range; $SnO_2$ zero to point six percent and within the range percentages in tenth of percent steps such that any tenth of a percent may be a limit of a diminished range; $\Sigma TiO_2+Zro_2+SnO_2$ three point zero to four point five percent and within the range percentages in tenth of percent steps such that any tenth of a percent may be a limit of a diminished range; $P_2O_5$ zero to two point zero percent and within the range percentages in tenth of percent steps such that any tenth of a percent may be a limit of a diminished range.

Expressed in other words, the glass composition in accordance with the present invention may comprise, in weight percent based on oxide: lithium oxide ($Li_2O$) in the range of from 3.2 percent to 5.0 percent; sodium oxide ($Na_2O$) from 0 percent to 1.5 percent; potassium oxide ($K_2O$) from 0 percent to 1.5 percent; the sum of sodium oxide ($Na_2O$)+ potassium oxide ($K_2O$) may be in the range of from 0.2 percent to 2.0 percent; magnesium oxide (MgO) in the range of from 0.1 percent to 2.2 percent; calcium oxide (CaO) in the range of from 0 percent to 1.5 percent; strontium oxide (SrO) from 0 percent to 1.5 percent; barium oxide (BaO) may be present in the range of from 0 percent to 2.5 percent; zinc oxide (ZnO) may be present in the range of from 0 percent to less than 1.5 percent; aluminium oxide ($Al_2O_3$) in the range of from 19 percent to 25 percent; silicon dioxide ($SiO_2$) in the range of from 55 percent to 69 percent; titanium dioxide ($TiO_2$) in the range of from 1.0 percent to 5.0 percent; zirconium dioxide ($ZrO_2$) in the range of from 1.0 percent to 2.5 percent; tin dioxide ($SnO_2$) may be present from 0 percent to less than 1.0 percent; the sum of titanium dioxide ($TiO_2$)+zirconium ($ZrO_2$)+tin dioxide ($SnO_2$) may be in the range of from 2.5 percent to 5.0 percent; phosphoric oxide ($P_2O_5$) may be present in the range of from 0 percent to 3.0 percent. Of course, there may be present coloring agents from the group comprising compounds of: vanadium (V), chromium (Cr), manganese (Mn), iron (Fe), cobalt (Co), copper (Cu), nickel (Ni), selenium (Se) and/or chlorine (Cl).

It will be understood that other ranges herein are to be treated similarly.

Some examples of flat glass production which may possibly be incorporated in an example of the present invention may be found in U.S. Pat. No. 3,218,143 issued to De Lajarte on Nov. 16, 1965 and entitled "Process for the manufacture of flat glass"; U.S. Pat. No. 3,930,826 issued to Schornhorst on Jan. 6, 1976 and entitled "Conditioning flat glass for removal from supporting liquid following forming"; U.S. Pat. No. 3,938,979 issued to Plumat on Feb. 147, 1976 and entitled "Method and apparatus for vertically drawing a glass ribbon"; U.S. Pat. No. 4,801,321 issued to Pita et al. on Jan. 31, 1989 and entitled "Method for the manufacturing of glass sheets"; U.S. Pat. No. 4,214,886 issued to Shay et al. on Jul. 29, 1980 and entitled "Forming laminated sheet glass"; U.S. Pat. No. 4,209,315 issued to Spurling on Jun. 24, 1980 and entitled "Glass forming apparatus"; U.S. Pat. No. 4,929,266 issued to Cozac et al. on May 29, 1990 and entitled "Method of manufacturing glass"; and U.S. Pat. No. 5,078,777 issued to Cozac et al. on Jan. 7, 1992 and entitled "Glass-melting furnace", all of these U.S. patents being hereby expressly incorporated by reference as if set forth in their entirety herein.

Some examples relating to aluminosilicate, features of which may possibly be incorporated in an embodiment of the present invention may be found in U.S. Pat. No. 4,084, 974 issued to Beall et al. on Apr. 18, 1978 and entitled "Method of making light-absorbing glass-ceramic articles"; U.S. Pat. No. 4,530,909 issued to Makishima et al. on Jul. 23, 1985 and entitled "Aluminosilicate glass containing $Y_2O_3$ concentrate and $ZRO_2$"; U.S. Pat. No. 4,626,515 issued to Chyung et al. on Dec. 2, 1986 and entitled "Reinforced alkaline earth aluminosilicate glasses"; U.S. Pat. No. 4,846,866 issued to Chyung et al. on Jul. 11, 1989 and entitled "Providing reinforced alkaline earth aluminosilicate glasses"; and U.S. Pat. No. 6,060,168 issued to Kohli on May 9, 2000 and entitled "Glasses for display panels and photovoltaic devices", all of these U.S. patents being hereby expressly incorporated by reference as if set forth in their entirety herein.

Some examples relating to methods of making halogen lamp bulbs and relating to halogen lamp bulbs, features of which may possibly be incorporated in an embodiment of the present invention may be found in U.S. Pat. No. 4,140, 939 issued to Bonazoli et al. on Feb. 20, 1979 and entitled "Tungsten halogen lamp for headlights"; U.S. Pat. No. 4,319,156 issued to Bienvenue et al. on Mar. 9, 1982 and entitled "Vehicle headlight having dual filament tungsten halogen lamp"; U.S. Pat. No. 4,339,685 issued to Saguchi et al. on Jul. 13, 1982 and entitled "Sealed beam lamp assembly"; U.S. Pat. No. 4,342,142 issued to Nieda et al. on Aug. 3, 1982 and entitled "Method for manufacturing sealed-beam type electric bulb"; U.S. Pat. No. 4,540,911 issued to Arai et al. on Sep. 10, 1985 and entitled "Halogen lamp unit"; U.S. Pat. No. 4,607,016 issued to Danielson et al. on Aug. 19, 1986 and entitled "Glass for use as tungsten-halogen lamp envelopes"; U.S. Pat. No. 4,801,845 issued to Kiesel on Jan. 31, 1989 and entitled "Halogen incandescent lamp structure"; U.S. Pat. No. 5,513,08 issued to Ho on Apr. 30, 1996 and entitled "Ultraviolet-reduced halogen lamp"; U.S. Pat. No. 5,850,124 issued to Hasegawa et al. on Dec. 15, 1998 and entitled "Automobile lamp bulb with welded low beam shield"; U.S. Pat. No. 5,855,430 issued to Coushaine et al. on Jan. 5, 1999 and entitled "Vehicle headlamp assembly"; U.S. Pat. No. 5,949,181 issued to Tabata et al. on Sep. 7, 1999 and entitled "Automotive lamp bulb with alignment bead"; U.S. Pat. No. 5,984,750 issued to Nishibori et al. on Nov. 16, 1999 and entitled "Method of sealing halogen lamp"; and U.S. Pat. No. 6,183,113 B1 issued to Waldmann on Feb. 6, 2001 and entitled "Halogen lamp", all of these U.S. patents being hereby expressly incorporated by reference as if set forth in their entirety herein.

Some examples relating to float glass processes, features of which may possibly be incorporated in an embodiment of the present invention may be found in U.S. Pat. No. 4,305, 745 issued to Mouly on Dec. 15, 1981 and entitled "Method of attenuating glass in a float process"; U.S. Pat. No. 4,342,583 issued to Kapura et al. on Aug. 3, 1982 and entitled "Apparatus and method for attenuating floating glass ribbon"; U.S. Pat. No. 4,357,156 issued to Seymour on Nov. 2, 1982 and entitled "Minimizing surface distortion while shaping glass sheets"; U. S. Pat. No. 4,402,722 issued to Edge on Sep. 6, 1983 and entitled "Cooling arrangement and method for forming float glass"; U.S. Pat. No. 4,741, 7540 issued to Bricker on May 3, 1988 and entitled "Method an apparatus for cooling in a float glass forming operation"; and U.S. Pat. No. 5,643,349 issued to Piper et al on Jul. 1, 1997 and entitled "Apparatus for applying $SO_3$ to float glass", all of these U.S. patents being hereby expressly incorporated by reference as if set forth in their entirety herein.

Some examples of ceramising glass-ceramic or glass, features of which may possibly be incorporated in an embodiment of the present invention may be found in U.S. Pat. No. 4,824,463 issued to Neuhoff et al. on Apr. 25, 1989 and entitled "Process for ceramising glass-ceramic sheets"; and U.S. Pat. No. 4,851,022 issued to Gunthner on Jul. 25, 1989 and entitled "Method and oven for ceramising glass plates", all of these U.S. patents being hereby expressly incorporated by reference as if set forth in their entirety herein.

Some examples of crystallizable glass and glass-ceramics made therefrom, features of which may possibly be incorporated in an embodiment of the present invention may be found in U.S. Pat. No. 3,970,463 issued to Planchock et al. on Jul. 20, 1976 and entitled "Glasses and glass-ceramics and products made therefrom"; U.S. Pat. No. 4,011,091 issued to McCollister on Mar. 8, 1977 and entitled "Ceramic materials containing keatite"; U.S. Pat. No. 4,100,001 issued to Franklin on Jul. 11, 1978 and entitled "Thermally crystallizable glasses and glass-ceramics made therefrom"; U.S. Pat. No. 4,126,476 issued to Grossman on Nov. 21, 1978 and entitled "Aluminous quartz ceramics and method"; U.S. Pat. No. 4,391,914 issued to Beall et al. on Jul. 5, 1983 and entitled "Strengthened glass-ceramic article and method"; U.S. Pat. No. 6,197,710 B1 issued to Chara et al. on Mar. 6, 2001 and entitled "Luminous glass ceramics"; and U.S. Pat. No. 6,204,211 B1 issued to Ohara et al. on Mar. 20, 2001 and entitled "Luminous glass ceramics", all of these U.S. patents being hereby expressly incorporated by reference as if set forth in their entirety herein.

Some examples of stressed glass, chemically stressed glass and/or processes for making stressed or chemically stressed glass, features of which may possibly be incorporated in an embodiment of the present invention may be found in U.S. Pat. No. 3,931,438, issued to Beall et al. on Jan. 6, 1976 and entitled, "Differential Densification of Strengthening Glass-Ceramics"; U.S. Pat. No. 3,962,515, issued to Dumbaugh, Jr. et al. on Jun. 8, 1976 and entitled, "Strengthened Composite Glass Article and Method of Production"; U.S. Pat. No. 3,997,249, issued to Krohn et al. on Dec. 14, 1976 and entitled, "Ion Exchangeable Segment Glass"; U.S. Pat. No. 4,112,485, issued to Sutter on Sep. 5, 1978 and entitled, "Impact Resistant Explosion Proof Lamp Comprising Encapsulated Light Source"; U.S. Pat. No. 4,287,018, issued to Gulati et al. on Sep. 1, 1981 and entitled, "Method for Finishing Glass-Plastic Laminated Lens Blanks"; U.S. Pat. No. 4,397,669, issued to Haisma et al. on Aug. 9, 1983 and entitled, "Method for the Precision Moulding of Glass Articles, Method of Maufacturing a Mould, and Mould for the Precision Moulding of Glass Articles"; U.S. Pat. No. 5,188,990 issued to Dumesnil et al. on Feb. 23, 1993 and entitled, "Low Temperature Sealing Glass Compositions"; and U.S. Pat. No. 6,184,162 B1, issued to Speit et al. on Feb. 6, 2001 and entitled, "Glasses and Glass-Ceramics with High E-Moduli," all of these U.S. patents being hereby expressly incorporated by reference as if set forth in their entirety herein.

Some examples of prestressable glass, prestressed glass, chemically prestressed glass and/or processes for making prestressed or chemically prestressed glass, features of which may possibly be incorporated in an embodiment of the present invention may be found in U.S. Pat. No. 3,976,898, issued to Newson on Aug. 24, 1976 and entitled "Prestressed Glass, Aezoelectric Electrical Power Source"; U.S. Pat. No. 4,170,505, issued to Zgraggen on Oct. 9, 1979 and entitled, "Method for Making and Applying Irradiation Curable Glass Banding"; U.S. Pat. No. 4,259,118, issued to Sack on Mar. 31, 1981 and entitled, "Thermally High Pre-Stressable Glass with High Hot Stressing Factors"; U.S. Pat. No. 4,332,241, issued to Dalstein et al. on Jun. 1, 1982 and entitled, "Solar Energy Collector Panel"; U.S. Pat. No. 4,715,879, issued to Schmitte et al. on Dec. 29, 1987 and entitled, "Method for the Manufacture of a Tempered and/or Curved Glass Pane with Reduced Transmission"; U.S. Pat. No. 4,781,432, issued to Zonger et al. on Nov. 1, 1988 and entitled, "Optic Fibre Transmission Cable Reinforcement"; U.S. Pat. No. 5,846,280, issued to Speit on Dec. 8, 1998 and entitled, "Process for Production of Chemically Prestressed Glass"; and U.S. Pat. No. 5,895,768, issued to Speit on Apr. 20, 1999 and entitled, "Chemically Prestressable Aluminosilicate Glass and Products Made Therefrom," all of these U.S. patents being hereby expressly incorporated by reference as if set forth in their entirety herein.

Some examples of ceramic materials that may be used on chemically stressed components may be found in the following U.S. Patents: U.S. Pat. No. 5,182,411, issued to Vaahs et al. on Jan. 26, 1993 and entitled, "Polymeric Chlorosilazanes, Process for Their Preparation, Ceramic Materials Containing Silicon Nitride Which Can Be Manufactured Therefrom, and Their Manufacture"; U.S. Pat. No. 5,189,132, issued to Vaahs et al. on Feb. 23, 1993 and entitled, "Polymeric Hydridochlorosilazanes, Process for Their Preparation, Ceramic Materials Containing Silicon Nitride Which Can Be Manufactured Therefrom, and Their Manufacture"; and U.S. Pat. No. 5,196,556 issued to Vaahs et al. on Mar. 23, 1993, and entitled, "Polysubstituted Chlorine-Containing Silazane Polymers, Process for Their Preparation, Ceramic Materials Containing Silicon Nitride Which Can Be Manufactured Therefrom, and Their Manufacture."

In accordance with one aspect of the invention there is provided a flat float glass having surface defects which are minimized; said glass being configured at least as one of: (a) to be prestressable; (b) to be capable of being transformed into a glass ceramic having surficial high quartz mixed crystals or keatite mixed crystals; said glass having a minimized concentration of (c), (d), (e), and (f) to minimize surface defects on said glass; said glass comprising: (c) less than three hundred parts per billion of platinum (Pt); (d) less than thirty parts per billion of rhodium (Rh); (e) less than one point five weight percent zinc oxide (ZnO); and (f) less than one weight percent of tin dioxide ($Sno_2$); and said glass comprising refined glass that is refined during melting in the absence of substantially all of (i.), and (ii.): (i.) arsenic oxide; and (ii.) antimony oxide.

In accordance with another aspect the invention comprises a flat float glass having surface defects which are minimized; said glass comprising at least one of: (a) a prestressable flat float glass; (b) a glass ceramic being transformable into a glass ceramic comprising high quartz mixed crystals; and (c) a glass ceramic being transformable into a glass ceramic comprising keatite mixed crystals; said glass having a minimized concentration of (d), (e), (f), and (g) to minimize surface defects on said glass during floating thereof, said glass comprising: (d) less than three hundred parts per billion of platinum (Pt); (e) less than thirty parts per billion of rhodium (Rh); (f) less than one point five weight percent zinc oxide (ZnO); and (g) less than one weight percent of tin dioxide ($SnO_2$); and said glass comprising refined glass; said refined glass being substantially free of all of (i.), and (ii.): (i.) arsenic oxide; and (ii.) antimony oxide.

In yet another aspect of the invention there is provided a method of making flat float glass having surface defects which are minimized, said method comprising: (A) melting and refining glass substantially or essentially or substantially in the absence of (i.) arsenic oxide; and (ii.) antimony oxide; (B) floating said glass and minimizing surface defects in said glass during floating of said glass by minimizing the concentration of (a), (b), (c), and (d)to: (a) less than three hundred parts per billion of platinum (Pt); (b) less than thirty parts per billion of rhodium (Rh); (c) less than one point five weight percent zinc oxide (ZnO); and (d) less than one weight percent of tin dioxide ($SnO_2$); and producing at least one of: (C1) producing a prestressable flat float glass; (C2) producing a transformable flat float glass being transformable into a glass ceramic comprising high quartz mixed crystals; and (C3) producing a transformable flat glass being transformable into a glass ceramic comprising keatite mixed crystals.

Flat glass as claimed in one of the claims may possibly be characterized by the fact that to prevent the formation of an undesirable crystal band near the surface during floating, or possibly in the flat glass the following expression (in wt. %) is valid: $3.2 \times ZnO + TiO_2 < 4.3$. Flat glass as claimed in one of the claims may possibly be characterized by the fact that to prevent the formation of an undesirable crystal band near the surface during floating, or possibly in the flat glass the following expression (in wt. %) is valid: $3.2 \times ZnO + TiO_2 < 4.3$ to minimize an undesireable crystal band near the surface of the glass.

In accordance with one aspect the invention contemplates a flat glass characterized by the fact that the glass is technically, or industrially, free of zinc oxide (ZnO) and barium oxide (BaO). The invention also comprises flat glass characterized by the fact that the glass is substantially free of ZnO and BaO. The invention also comprises flat glass characterized by the fact that the glass is virtually free of ZnO and BaO. The invention further comprises flat glass characterized by the fact that the glass is essentially free of ZnO and BaO. The invention also comprises flat glass characterized by the fact that the glass is almost free of ZnO and BaO.

In accordance with one aspect, the invention contemplates a flat glass characterized by the fact that in order to achieve a low number of bubbles, or seeds, at least one alternative chemical fining agent such as $SnO_2$, $CeO_2$, sulfate compounds, chloride compounds for example, preferably 0.2–0.6 wt. % $SnO_2$ is added to the glass melt. The invention also contemplates a flat glass characterized by the fact that to achieve a low number of bubbles, or seeds, at least one chemical fining agent such as $SnO_2$, $CeO_2$, sulfate compounds, chloride compounds for example, preferably 0.2–0.6 wt. % $SnO_2$ is added to the glass melt.

Well-known conventional fining agents, or refining agents, that may possibly be used for fining the glass of the present invention comprise arsenic (As) compounds, such as arsenic oxide, arsenic chloride, arsenic nitrate, antimony (Sb) compounds, sodium (Na) compounds, such as sodium chloride, sodium sulfate, sodium sulfite, calcium (Ca) compounds, such as calcium sulfate, barium (Ba) compounds, such as barium sulfide, potassium (K) compounds, such as potassium chloride (KCl), potassium iodide (KI), and potassium bromide (KBr), ceric oxide ($CeO_2$), gypsum, elemental sulfur (S), charcoal (C), and possible combinations thereof.

At least some of such compounds may be found in HAWLEY'S CONDENSED CHEMICAL DICTIONARY, THIRTEENTH EDITION, revised by Richard J. Lewis, Sr., John Wiley & Sons, Inc., New York, ISBN #0-471-29205-2 (hardcover). They may possibly also be found in THE MERCK INDEX, An Encyclopedia of Chemicals, Drugs, and Biologicals, ELEVENTH EDITION, Susan Budavari, Editor, published by MERCK & CO., INC., Rahway, N.J., 1989, ISBN #911910-28-X.

Features relating to fining agents, which features may possibly be used in an embodiment of the present invention may be found in U.S. Pat. No. 3,954,656 issued to Deeg et al. on May 4, 1976 and entitled "Laser glasses with high damage threshold and method of making such glasses"; U.S. Pat. No. 4,038,090 issued to Gliemroth on Jul. 26, 1977 and entitled "Ion exchangeable glass having low thermal expansion"; U.S. Pat. No. 4,119,760 issued to Rinehart on Oct. 10, 1978 and entitled "Chemical strengthening of glass"; U.S. Pat. No. 4,138,235 issued to Turner on Feb. 6, 1979 and entitled "Method of making flat glass with lower sulfur-containing emissions"; U.S. Pat. No. 4,313,747 issued to Barton on Feb. 2, 1982 and entitled "Process for making glass with agglomerated refining agents"; U.S. Pat. No. 4,360,567 issued to Guillevic on Nov. 23, 1982 and entitled "Easy-to-clean glass or glass-ceramic cookware in the alkaline earth metal oxide-$Al_2O_3$-SiO field"; U.S. Pat. No. 4,607,016 issued to Danielson et al. on Aug. 19, 1986 and entitled "Glass for use as tungsten-halogen lamp envelopes"; U.S. Pat. No. 5,006,144 issued to Knavish et al. on Apr. 9, 1991 and entitled "Melting glass with oxidation control and lowered emission"; U.S. Pat. No. 5,547,904 issued to Watzke et al. on Aug. 20, 1996 and entitled "Borosilicate glass having improved UV transmission, thermal and chemical properties and methods of making and using same; U.S. Pat. No. 5,922,097 issued to Kobayashi et al. on Jul. 13, 1999 and entitled "Water enhanced fining process a method to reduce toxic emissions from glass melting furnaces; and U.S. Pat. No. 6,128,430 issued to Chu et al. on Oct. 3, 2000 and entitled "Composition for optical waveguide article and method for making continuous clad filament", all of these U.S. patents being hereby expressly incorporated by reference as if set forth in their entirety herein.

Coloring agents that may possibly be used with the glass of the present invention comprise, for example, compounds of vanadium (V), such as vanadium pentoxide ($V_2O_5$), chromium (Cr), such as chromic oxide ($Cr_2O_3$), manganese (Mn), such as manganese dioxide ($MnO_2$), iron (Fe), such as iron oxide ($Fe_2O_3$), cobalt (Co), such as cobalt oxide (CoO), copper (Cu), such as copper monoxide (CuO), nickel (Ni), such as nickel oxide (NiO), and selenium (Se), and/or chlorine (Cl compounds, and possible combinations thereof.

At least some of such compounds may be found in HAWLEY'S CONDENSED CHEMICAL DICTIONARY, THIRTEENTH EDITION, revised by Richard J. Lewis, Sr., John Wiley & Sons, Inc., New York, ISBN #0-471-29205-2 (hardcover). They may possibly also be found in THE MERCK INDEX, An Encyclopedia of Chemicals, Drugs, and Biologicals, ELEVENTH EDITION, Susan Budavari, Editor, published by MERCK & CO., INC., Rahway, N.J., 1989, ISBN #911910-28-X.

Features relating to coloring agents, which features may possibly be incorporated in an embodiment of the present invention, may be found in U.S. Pat. No. 4,397,667 issued to Morimoto et al. on Aug. 9, 1983 and entitled "Method of coloring glass sheet by diffusion and reduction of silver ions"; and U.S. Pat. No. 5,089,444 issued to Hattori et al. on Feb. 18, 1992 and entitled "Method of producing colored crystallized glass", all of these U.S. patents being hereby expressly incorporated by reference as if set forth in their entirety herein.

Some examples of features relating to prestressing of glass or prestressable glass, including the use of potassium and the like chemical prestressing, which features may possibly be incorporated in an embodiment of the present invention may be found in U.S. Pat. No. 3,984,252 issued to Kiefer on Oct. 5, 1976 and entitled "Fireproof glass windowpanes"; U.S. Pat. No. 4,259,118 issued to Sack on Mar. 31, 1981 and entitled "Thermally high pre-stressable glass with high hot stressing factors"; U.S. Pat. No. 4,671,814 issued to Aratani et al. on Jun. 9, 1987 and entitled "Method of strengthening glass article formed of float glass by ion exchange"; U.S. Pat. No. 4,715,879 issued to Schmitte et al. on Dec. 29, 1987 and entitled "Method for the manufacture of a tempered an/or curved glass pane with reduced transmission"; U.S. Pat. No. 5,846,280 issued to Speit on Dec. 8, 1998 and entitled "Process for production of chemically prestressed glass"; and U.S. Pat. No. 5,895,768 issued to Speit on Apr. 20, 1999 and entitled "Chemically prestressable aluminosilicate glass and products made therefrom", all of these U.S. patents being hereby expressly incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described herein above in the context of the preferred embodiments is not to be taken as limited to all of the provided details thereof, since modifications and variations thereof may be made without departing from the spirit and scope of the invention.

TABLE 1

Compositions and characteristics of float glasses

| Example No. | 1 | 2 | 3 | 4 | 5 | 6 | 7 | 8 | 9 | 10 |
|---|---|---|---|---|---|---|---|---|---|---|
| Composition (wt. %) on oxide basis: | | | | | | | | | | |
| $Li_2O$ | 4.1 | 4.17 | 3.85 | 3.8 | 3.8 | 4.3 | 3.65 | 4.2 | 4.2 | 4.0 |
| $Na_2O$ | 0.4 | 0.37 | 0.56 | 0.7 | 0.2 | 0.6 | 0.2 | 0.3 | 0.5 | 0.45 |
| $K_2O$ | 0.3 | 0.35 | — | — | 0.5 | 0.3 | 0.5 | 0.3 | 0.2 | 0.20 |
| MgO | 0.55 | 1.10 | 0.46 | 0.9 | 1.3 | 1.2 | 1.5 | 1.1 | 1.05 | 1.0 |
| CaO | — | — | — | 0.5 | 1.0 | — | 0.5 | — | 0.5 | — |
| BaO | — | — | 2.03 | 1.0 | — | 2.2 | — | — | — | — |
| ZnO | — | — | 1.40 | — | — | — | 0.4 | — | — | — |
| $Al_2O_3$ | 22.9 | 22.5 | 22.34 | 22.2 | 21.8 | 21.2 | 23.4 | 23.2 | 22.2 | 21.8 |
| $SiO_2$ | 66.1 | 65.62 | 65.1 | 65.5 | 66.3 | 65.2 | 64.1 | 64.4 | 65.75 | 67.4 |
| $TiO_2$ | 2.1 | 2.15 | 1.9 | 2.3 | 1.9 | 2.0 | 1.95 | 2.05 | 2.05 | 2.45 |
| $ZrO_2$ | 2.05 | 2.0 | 1.96 | 1.9 | 2.05 | 2.1 | 2.00 | 2.20 | 2.05 | 1.75 |
| $SnO_2$ | 0.15 | 0.24 | 0.4 | 0.2 | 0.15 | 0.3 | 0.10 | 0.25 | 0.20 | 0.25 |
| $P_2O_5$ | 1.35 | 1.3 | — | 1.0 | 1.2 | 0.6 | 1.7 | 2.0 | 1.3 | 0.7 |
| Misc. | | | | | | | | | | |
| Σ | 100.0 | 100.0 | 100.0 | 100.0 | 100.0 | 100.0 | 100.0 | 100.0 | 100.0 | 100.0 |
| Tg (° C.) | 703 | 694 | 682 | 704 | 698 | 671 | 688 | 695 | 697 | 702 |
| VA (° C.) | 1342 | 1334 | 1331 | 1331 | 1337 | 1317 | 1312 | 1310 | 1317 | 1337 |
| $\alpha_{20/300}$ ($10^{-6}$/K) | 4.0 | 4.1 | 4.1 | 4.2 | 4.0 | 4.6 | 4.0 | 4.2 | 4.3 | 4.0 |
| Light transmittance (%), 4 mm thickness | 90.5 | 91.4 | 89.9 | 87.9 | 90.1 | 89.7 | 90.5 | 90.0 | 90.1 | 90.3 |

| Example No. | 11 | 12 | 13 | 14 | 15 | 16 | 17 |
|---|---|---|---|---|---|---|---|
| Composition (wt. %) on oxide basis: | | | | | | | |
| $Li_2O$ | 4.25 | 4.15 | 3.8 | 4.4 | 3.8 | 3.8 | 3.8 |
| $Na_2O$ | 0.4 | 0.48 | 0.8 | 0.4 | 0.6 | 0.6 | 0.6 |
| $K_2O$ | 0.21 | 0.1 | — | 0.2 | — | — | — |
| MgO | 1.2 | 1.0 | 1.4 | 0.4 | 0.5 | 0.5 | 0.5 |
| CaO | — | 1.3 | — | 0.5 | — | — | — |
| BaO | — | — | — | 1.2 | 2.0 | 2.0 | 2.0 |
| ZnO | — | — | — | — | 1.7 | 1.7 | 1.7 |
| $Al_2O_3$ | 22.7 | 22.0 | 21.0 | 21.8 | 22.3 | 22.3 | 22.3 |
| $SiO_2$ | 65.54 | 65.55 | 66.5 | 64.9 | 65.0 | 65.0 | 65.0 |
| $TiO_2$ | 2.18 | 2.05 | 1.9 | 2.1 | 2.4 | 2.4 | 2.4 |
| $ZrO_2$ | 1.95 | 2.0 | 2.0 | 1.8 | 1.7 | 1.7 | 1.7 |
| $SnO_2$ | 0.24 | 0.27 | 0.4 | 0.3 | — | — | — |
| $P_2O_5$ | 1.33 | 1.1 | 2.2 | 2.0 | — | — | — |
| Misc. | | | | | 0.3 $As_2O_3$ | | 900 ppb Pt |
| Σ | 100.0 | 100.0 | 100.0 | 100.0 | 100.3 | 100.0 | 100.0 |
| Tg (° C.) | 684 | 683 | 698 | 686 | n.d. | 679 | n.d. |
| VA (° C.) | 1320 | 1310 | 1342 | 1329 | n.d. | 1295 | n.d. |
| $\alpha_{20/300}$ ($10^{-6}$/K) | 4.2 | 4.4 | 4.0 | 4.4 | n.d. | 4.1 | n.d. |
| Light transmittance (%), 4 mm thickness | 90.7 | 90.2 | 89.5 | 90.5 | n.d. | n.d. | n.d. | n.d. = not measured

TABLE 2

Transformation conditions and characteristics of the glass ceramics claimed by the invention

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Transformation conditions | | | | | | | | | | | | | | |
| Nucleation (° C.), (min) | 755 60 | 755 60 | 760 60 | 750 60 | 750 60 | 740 60 | 745 60 | 755 60 | 750 60 | 755 60 | 740 60 | 735 60 | 730 60 | 730 60 |
| Crystallization (° C.) (min) | 918 15 | 903 15 | 896 15 | 909 15 | 910 15 | 889 15 | 904 15 | 899 15 | 898 15 | 910 15 | 898 15 | 892 15 | 908 15 | 910 15 |
| Keatite transformation (° C.) (min) | — | — | — | — | — | — | — | — | — | — | 1020 60 | — | — | — |
| Ceramized characteristics: Crystal phases | hQMK | hQMK | hQMK | hQMK | hQMK | hQMK | hQMK | hQMK | hQMK | hQMK | Keatite MK | hQMK | hQMK | hQMK |
| Crystallite Size (nm) | 42 | 40 | 42 | 48 | 55 | 56 | 61 | 50 | 47 | 50 | n.d. | 51 | 43 | 44 |
| Appearance | transparent | transparent | transparent | transparent | transparent | transparent | transparent | transparent | transparent | transparent | white transparent | transparent | transparent | transparent |
| $\alpha_{20/300}$ ($10^{-6}$/K) | −0.34 | 0.03 | −0.20 | 0.31 | 0.47 | 0.53 | 0.57 | 0.04 | 0.15 | 0.02 | 1.17 | 0.26 | 0.24 | −0.29 |
| Light transmittance (%), 4 mm thickness | 84.7 | 84.8 | 80.8 | 83.0 | 83.9 | 73.4 | 83.5 | 84.9 | 84.3 | 79.1 | 18.8 | 83.5 | 83.3 | 82.3 | n.d. = not determined
hQMK = High quartz mixed crystals

What is claimed is:

1. A flat float glass comprising:

platinum, rhodium, zinc oxide, and tin dioxide, wherein:
the concentration of said platinum is contained in a non-zero amount less than 300 parts per billion;
the concentration of said rhodium is contained in a non-zero amount less than 30 parts per billion;
the concentration of said zinc oxide is contained in a non-zero amount less than 1.5 weight percent;
the concentration of said tin dioxide is contained in a non-zero amount less than 1 weight percent;
said concentrations of said platinum, said rhodium, said zinc oxide, and said tin dioxide configuring said flat float glass to have minimized surface defects; and
said flat float glass being configured to be one of:
prestressable into a glass-ceramic comprising one of:
high quartz mixed crystals; and
keatite mixed crystals; and
transformable into a glass-ceramic comprising one of:
high quartz mixed crystals; and
keatite mixed crystals.

2. The flat float glass according to claim 1, wherein:
said flat float glass comprises refined glass;
said refined glass being substantially free of both of (i.) and (ii.):
(i.) arsenic oxide; and
(ii.) antimony oxide; to minimize surface metallic coatings.

3. The flat float glass according to claim 2, wherein said flat float glass comprises a lithium oxide—aluminum oxide—silicon dioxide glass.

4. The flat float glass according to claim 3, wherein said flat float glass contains in weight percent on an oxide basis:

| | |
|---|---|
| lithium oxide (Li$_2$O) | 3.2–5.0 |
| aluminum oxide (Al$_2$O$_3$) | 19–25 |
| silicon dioxide (SiO$_2$) | 55–69. |

5. The flat float glass according to claim 3, wherein said flat float glass further contains in weight percent on an oxide basis:

| | |
|---|---|
| sodium oxide (Na$_2$O) | 0–1.5 |
| potassium oxide (K$_2$O) | 0–1.5 |
| with the sum of sodium oxide (Na$_2$O) + potassim oxide (K$_2$O) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | ≦1.5 |
| titanium dioxide (TiO$_2$) | 1.0–5.0 |
| zirconium dioxide (ZrO$_2$) | 1.0–2.5 |
| tin dioxide (SnO$_2$) | ≦1.0 |
| with the sum of titanium dioxide (TiO$_2$) + zirconium (ZrO$_2$) + tin dioxide (SnO$_2$) | 2.5–5.0 |
| phosphoric oxide (P$_2$O$_5$) | 0–3.0 |

6. The flat float glass according to claim 2, comprising one of (i.), (ii.), (iii.), (iv.), (v.), (vi.), (vii.), (viii.), (ix.), (x.), (xi.), (xii.), and (xiii.):

(i.) said flat float glass comprises in weight percent on an oxide basis a composition of:

| | |
|---|---|
| lithium oxide (Li$_2$O) | 3.2–5.0 |
| sodium oxide (Na$_2$O) | 0–1.5 |
| potassium oxide (K$_2$O) | 0–1.5 |
| with the sum of sodium oxide (Na$_2$O) + potassium oxide (K$_2$O) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide (Al$_2$O$_3$) | 19–25 |
| silicon dioxide (SiO$_2$) | 55–69 |
| titanium dioxide (TiO$_2$) | 1.0–5.0 |
| zirconium dioxide (ZrO$_2$) | 1.0–2.5 |
| tin dioxide (SnO$_2$) | <1.0 |
| with the sum of titanium dioxide (TiO$_2$) + zirconium dioxide (ZrO$_2$) + tin dioxide (SnO$_2$) | 2.5–5.0 |
| phosphoric oxide (P$_2$O$_5$) | 0–3.0; |

(ii.) said flat float glass comprises colored glass;

said colored glass comprises a coloring agent;

said coloring agent comprises at least one compound of: vanadium (V), chromium (Cr), manganese (Mn), iron (Fe), cobalt (Co), copper (Cu), nickel (Ni), selenium (Se), and chlorine (Cl);

(iii.) said flat float glass comprises in weight percent on an oxide basis a composition of:

| | |
|---|---|
| lithium oxide (Li$_2$O) | 3.5–4.5 |
| sodium oxide (Na$_2$O) | 0.2–1.0 |
| potassium oxide (K$_2$O) | 0–0.8 |
| with the sum of sodium oxide (Na$_2$O) + potassium oxide (K$_2$O) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≦1.0 |
| aluminum oxide (Al$_2$O$_3$) | 19–24 |
| silicon dioxide (SiO$_2$) | 60–68 |
| titanium dioxide (TiO$_2$) | 1.0–2.0 |
| zirconium dioxide (ZrO$_2$) | 1.2–2.2 |
| tin dioxide (SnO$_2$) | ≦0.6 |
| with the sum of titanium dioxide (TiO$_2$) + zirconium dioxide (ZrO$_2$) + tin dioxide (SnO$_2$) | 3.0–4.5 |
| phosphoric oxide (P$_2$O$_5$) | 0–2.0; |

(iv.) said flat float glass comprises glass being configured to be chemically prestressable; and
the sum of the percentage of lithium oxide (Li$_2$O) and the percentage of sodium oxide (Na$_2$O) being greater than 3.5 percent by weight based on oxide;

(v.) said flat float glass comprises chemically prestressable glass;

(vi.) said flat float glass comprises:
the sum of 3.2 times the percentage of zinc oxide (ZnO) and the percentage of titanium dioxide (TiO$_2$) being equal to or less than 4.3 weight percent based on oxide to minimize surface crystal bands;

(vii.) said flat float glass comprises
less than 200 parts per million iron oxide (Fe$_2$O$_3$); and
less than 2.5 weight percent of titanium dioxide (TiO$_2$), on an oxide basis;
to minimize coloration due to iron oxide and titanium dioxide upon vitrification of said flat float glass;

(viii.) said flat float glass comprises glass being configured to have, at a thickness of 4 millimeter, light transmittances of one of:
more than 89 percent; and
more than 90 percent;

(ix.) said flat float glass being substantially free of: barium oxide (BaO);

(x.) said flat float glass is configured to have:
a coefficient of thermal expansion $\alpha_{20/300}$ between 3.5 millionths per degree Kelvin and 5.0 millionths per degree Kelvin;
a transformation temperature $T_g$ between 600 and 750 degrees Celsius; and
a processing temperature $V_A$ below 1350 degrees Celsius;

(xi.) said flat float glass comprises one of:
(a.) a flat float glass being configured to be transformable into one of:
a transparent glass-ceramic;
a translucent glass-ceramic; and
an opaque glass-ceramic;
(b.) a flat float glass being configured to be transformable into a glass-ceramic comprising keatite mixed crystals as the predominant crystal phase and said flat float glass being configured to have a coefficient of thermal expansion $\alpha_{20/700}$ of less than 1.5 millionths per degree Kelvin;
(c.) a flat float glass being configured to be transformable into a glass-ceramic comprising high quartz mixed crystals as the predominant crystal phase and said flat float glass being configured to have a coefficient of thermal expansion $\alpha_{20/700}$ in the range of one of:
from minus 0.5 five millionths per degree Kelvin to 0.5 millionths per degree Kelvin; and
minus 0.15 millionths per degree Kelvin to 0.15 millionths per degree Kelvin;

(xii.) said flat float glass comprises a flat float glass transformable into a transparent glass-ceramic;

said glass-ceramic comprising in weight percent based on oxide:

less than 2 percent of titanium dioxide (TiO$_2$);

less than 0.5 percent of tin dioxide (SnO$_2$); and less than 200 parts per million iron oxide (Fe$_2$O$_3$); and said glass-ceramic being configured to have a light transmittance, at 4 millimeters thickness, of less than eighty percent;

(xiii.) said flat float glass comprises a flat float glass being configured to be transformable into a glass-ceramic;

said glass-ceramic being colored with a coloring agent comprising at least one compound of: vanadium (V), chromium (Cr), manganese (Mn), iron (Fe), cobalt (Co), nickel (Ni);

said glass-ceramic being configured to have a light transmittance of less than five percent at a thickness of 4 millimeters.

7. The flat float glass according to claim 2, comprising all of: (i.), (ii.), (iii.), (iv.), (v.), and (vi.):
(i.) one of (a.) and (b.):
(a.) said flat float glass comprises in weight percent on an oxide basis a composition of:

| | |
|---|---|
| lithium oxide (Li$_2$O) | 3.2–5.0 |
| sodium oxide (Na$_2$O) | 0–1.5 |
| potassium oxide (K$_2$O) | 0–1.5 |
| with the sum of sodium oxide (Na$_2$O) + potassium oxide (K$_2$O) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide (Al$_2$O$_3$) | 19–25 |
| silicon dioxide (SiO$_2$) | 55–69 |
| titanium dioxide (TiO$_2$) | 1.0–5.0 |
| zirconium dioxide (ZrO$_2$) | 1.0–2.5 |
| tin dioxide (SnO$_2$) | <1.0 |
| with the sum of titanium dioxide (TiO$_2$) + zirconium dioxide (ZrO$_2$) + tin dioxide (SnO$_2$) | 2.5–5.0 |
| phosphoric oxide (P$_2$O$_5$) | 0–3.0; and |

(b.) said flat float glass comprises in weight percent on an oxide basis a composition of:

| | |
|---|---|
| lithium oxide (Li$_2$O) | 3.5–4.5 |
| sodium oxide (Na$_2$O) | 0.2–1.0 |
| potassium oxide (K$_2$O) | 0–0.8 |
| with the sum of sodium oxide (Na$_2$O) + potassium oxide (K$_2$O) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≤1.0 |
| aluminum oxide (Al$_2$O$_3$) | 19–24 |
| silicon dioxide (SiO$_2$) | 60–68 |
| titanium dioxide (TiO$_2$) | 1.0–2.0 |
| zirconium dioxide (ZrO$_2$) | 1.2–2.2 |
| tin dioxide (SnO$_2$) | ≤0.6 |
| with the sum of titanium dioxide (TiO$_2$) + zirconium dioxide (ZrO$_2$) + tin dioxide (SnO$_2$) | 3.0–4.5 |
| phosphoric oxide (P$_2$O$_5$) | 0–2.0; |

(ii.) said flat float glass comprises the sum of 3.2 times the percentage of zinc oxide (ZnO) and the percentage of titanium dioxide (TiO$_2$) being equal to or less than 4.3 weight percent based on oxide to minimize surface crystal bands;

(iii.) said flat float glass comprises:
less than 200 parts per million iron oxide (Fe$_2$O$_3$); and
less than 2.5 weight percent of titanium dioxide (TiO$_2$), on an oxide basis;
to minimize coloration due to iron oxide and titanium dioxide upon vitrification of said flat float glass;

(iv.) said flat float glass comprises glass configured to have, at a thickness of 4 millimeters, light transmittances of one of:
more than 89 percent; and
more than 90 percent;

(v.) said flat float glass being substantially free of:
barium oxide (BaO);

(vi.) said flat float glass is configured to have:
a coefficient of thermal expansion $\alpha_{20/300}$ between 3.5 millionths per degree Kelvin and 5.0 millionths per degree Kelvin;
a transformation temperature $T_g$ between 600 and 750 degrees Celsius; and
a processing temperature $V_A$ below 1350 degrees Celsius.

8. The flat float glass according to claim 7, comprising one of (viii.), (ix.), (x.), (xi.), and (xii.):

(viii.) said flat float glass comprises colored glass;
said colored glass comprises a coloring agent;
said coloring agent comprising at least one compound of: vanadium (V), chromium (Cr), manganese (Mn), iron (Fe), cobalt (Go), copper (Cu), nickel (Ni), selenium (Se), and chlorine (Cl);

(ix.) said flat float glass comprises one of:
(a.) a flat float glass being configured to be transformable into one of:
a transparent glass-ceramic;
a translucent glass-ceramic; and
an opaque glass-ceramic;
(b.) a flat float glass being configured to be transformable into a glass-ceramic comprising keatite mixed crystals as the predominant crystal phase and said flat float glass being configured to have a coefficient of thermal expansion $\alpha 20/700$ of less than 1.5 millionths per degree Kelvin;
(c.) a flat float glass being configured to be transformable into a glass-ceramic comprising high quartz mixed crystals as the predominant crystal phase and said flat float glass being configured to have a coefficient of thermal expansion $\alpha 20/700$ in the range of one of;
from minus 0.5 five millionths per degree Kelvin to 0.5 millionths per degree Kelvin; and
minus 0.15 millionths per degree Kelvin to 0.15 millionths per degree Kelvin;

(x.) said flat float glass comprises a flat float glass configured to be transformable into a transparent glass-ceramic;
said glass-ceramic comprising in weight percent based on oxide:
less than 2 percent of titanium dioxide (TiO$_2$);
less than 0.5 percent of tin dioxide (SnO$_2$); and
less than 200 parts per million iron oxide (Fe$_2$O$_3$); and
said glass-ceramic being configured to have a light transmittance, at 4 millimeters thickness, of less than eighty percent;

(xi.) said flat float glass comprises an flat float glass being configured to be transformable into a glass-ceramic;
said glass-ceramic being colored with a coloring agent comprising at least one compound of: vanadium (V), chromium (Cr), manganese (Mn), iron (Fe), cobalt (Co), nickel (Ni);
said glass-ceramic being configured to have a light transmittance of less than five percent at a thickness of 4 millimeters; and (xii.) said flat float glass comprises glass being configured to be chemically prestressable;
said chemically prestressable glass comprises the sum of the percentage of lithium oxide (Li$_2$O) and the percentage of sodium oxide (Na$_2$O) being greater than 3.5 percent by weight based on oxide.

9. A glass ceramic comprising:
platinum, rhodium, zinc oxide, and tin dioxide, wherein:
the concentration of said platinum is contained in a non-zero amount less than 300 parts per billion;
the concentration of said rhodium is contained in a non-zero amount less than 30 parts per billion;
the concentration of said zinc oxide is contained in a non-zero amount less than 1.5 weight percent;

the concentration of said tin dioxide is contained in a non-zero amount less than 1 weight percent; and said glass ceramic comprising one of:
  high quartz mixed crystals; and
  keatite mixed crystals.

10. The glass ceramic according to claim 9, comprising one of (i.), (ii.), (iii.), (iv.), (v.), (vi.), (vii.), viii.), (ix.), (x.), (xi.), (xii.), and (xiii.):

(i.) said glass ceramic comprises in weight percent on an oxide basis a composition of:

| | |
|---|---|
| lithium oxide ($Li_2O$) | 3.2–5.0 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide ($Al_2O_3$) | 19–25 |
| silicon dioxide ($SiO_2$) | 55–69 |
| titanium dioxide ($TiO_2$) | 1.0–5.0 |
| zirconium dioxide ($ZrO_2$) | 1.0–2.5 |
| tin dioxide ($SnO_2$) | <1.0 |
| with the sum of titanium dioxide ($TiO_2$) + zirconium dioxide ($ZrO_2$) + tin dioxide ($SnO_2$) | 2.5–5.0 |
| phosphoric oxide ($P_2O_5$) | 0–3.0; |

(ii.) said glass ceramic comprises colored glass:

said colored glass comprises a coloring agent;

said coloring agent comprises at least one compound of: vanadium (V), chromium (Cr), manganese (Mn), iron (Fe), cobalt (Co), copper (Cu), nickel (Ni), selenium (Se), and chlorine (Cl); (iii.) said glass ceramic comprises in weight percent on an oxide basis a composition of:

| | |
|---|---|
| lithium oxide ($Li_2O$) | 3.5–4.5 |
| sodium oxide ($Na_2O$) | 0.2–1.0 |
| potassium oxide ($K_2O$) | 0–0.8 |
| with the sum of sodium oxide ($Na_2O$) + potassium oxide ($K_2O$) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≦1.0 |
| aluminum oxide ($Al_2O_3$) | 19–24 |
| silicon dioxide ($SiO_2$) | 60–68 |
| titanium dioxide ($TiO_2$) | 1.0–2.0 |
| zirconium dioxide ($ZrO_2$) | 1.2–2.2 |
| tin dioxide ($SnO_2$) | ≦0.6 |
| with the sum of titanium dioxide ($TiO_2$) + zirconium dioxide ($ZrO_2$) + tin dioxide ($SnO_2$) | 3.0–4.5 |
| phosphoric oxide ($P_2O_5$) | 0–2.0; |

(iv.) said glass ceramic comprises chemically prestressed float glass;

said chemically prestressed glass comprises: the sum of the percentage of lithium oxide ($Li_2O$) and the percentage of sodium oxide ($Na_2O$) being greater than 3.5 percent by weight based on oxide;

(v.) said glass ceramic comprises chemically prestressed glass;

(vi.) said glass ceramic comprises:

the sum of 3.2 times the percentage of zinc oxide (ZnO) and the percentage of titanium dioxide ($TiO_2$) being equal to or less than 4.3 weight percent based on oxide;

to minimize surface crystal bands;

(vii.) said glass ceramic comprises:

less than 200 parts per million iron oxide ($Fe_2O_3$); and
less than 2.5 weight percent of titanium dioxide ($TiO_2$), on an oxide basis;

to minimize coloration due to iron oxide and titanium dioxide upon vitrification of said glass ceramic;

(viii.) said glass ceramic comprises glass being configured to have, at a thickness of 4 millimeters, light transmittances of one of:
  more than 89 percent; and
  more than 90 percent;

(ix.) said glass ceramic being substantially free of barium oxide (BaO);

(x.) said glass ceramic is configured to have:

a coefficient of thermal expansion $\alpha_{20/300}$ between 3.5 millionths per degree Kelvin and 5.0 millionths per degree Kelvin;

a transformation temperature $T_g$ between 600 and 750 degrees Celsius; and a processing temperature $V_A$ below 1350 degrees Celsius;

(xi.) said glass ceramic comprises one of:
  (a.) a glass ceramic comprising one of:
    a transparent glass-ceramic;
    a translucent glass-ceramic; and
    an opaque glass-ceramic;
  (b.) a glass-ceramic comprising keatite mixed crystals as the predominant crystal phase and said glass-ceramic being configured to have a coefficient of thermal expansion $\alpha_{20/700}$ of less than 1.5 millionths per degree Kelvin;
  (c.) a glass-ceramic comprising high quartz mixed crystals as the predominant crystal phase and said glass-ceramic being configured to have a coefficient of thermal expansion $\alpha_{20/700}$ in the range of one of:
    from minus 0.5 five millionths per degree Kelvin to 0.5 millionths per degree Kelvin; and
    minus 0.15 millionths per degree Kelvin to 0.15 millionths per degree Kelvin;

(xii.) said glass ceramic comprises a transparent glass-ceramic comprising in weight percent based on oxide;

less than 2 percent of titanium dioxide ($TiO_2$);

less than 0.5 percent of tin dioxide ($SnO_2$); and less than 200 parts per million iron oxide ($Fe_2O_3$); and said glass-ceramic being configured to have a light transmittance, at 4 millimeters thickness, of less than eighty percent;

(xiii.) said glass ceramic comprises a glass-ceramic being colored with a coloring agent comprising at least one compound of: vanadium (V), chromium (Cr), manganese (Mn), iron (Fe), cobalt (Co), nickel (Ni);

said colored glass-ceramic being configured to have a light transmittance of less than five percent at a thickness of 4 millimeters; and wherein said glass ceramic contains lithium oxide—aluminum oxide—silicon dioxide.

11. The glass ceramic according to claim 9, comprising all of: (i.), (ii.), (iii.), (iv.), (v.), and (vi.):
 (i.) one of (a.) and (b.):
  (a.) said glass ceramic comprises in weight percent on an oxide basis a composition of:

| | |
|---|---|
| lithium oxide ($Li_2O$) | 3.2–5.0 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide ($Al_2O_3$) | 19–25 |
| silicon dioxide ($SiO_2$) | 55–69 |
| titanium dioxide ($TiO_2$) | 1.0–5.0 |
| zirconium dioxide ($ZrO_2$) | 1.0–2.5 |
| tin dioxide ($SnO_2$) | <1.0 |
| with the sum of titanium dioxide ($TiO_2$) + zirconium dioxide ($ZrO_2$) + tin dioxide ($SnO_2$) | 2.5–5.0 |
| phosphoric oxide ($P_2O_5$) | 0–3.0; |

(b.) said glass ceramic comprises in weight percent on an oxide basis a composition of:

| | |
|---|---|
| lithium oxide ($Li_2O$) | 3.5–4.5 |
| sodium oxide ($Na_2O$) | 0.2–1.0 |
| potassium oxide ($K_2O$) | 0–0.8 |
| with the sum of sodium oxide ($Na_2O$) + potassium oxide ($K_2O$) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≦1.0 |
| aluminum oxide ($Al_2O_3$) | 19–24 |
| silicon dioxide ($SiO_2$) | 60–68 |
| titanium dioxide ($TiO_2$) | 1.0–2.0 |
| zirconium dioxide ($ZrO_2$) | 1.2–2.2 |
| tin dioxide ($SnO_2$) | ≦0.6 |
| with the sum of titanium dioxide ($TiO_2$) + zirconium dioxide ($ZrO_2$) + tin dioxide ($SnO_2$) | 3.0–4.5 |
| phosphoric oxide ($P_2O_5$) | 0–2.0; |

(ii.) said glass ceramic comprises:
  the sum of 3.2 times the percentage of zinc oxide (ZnO) and the percentage of titanium dioxide ($TiO_2$) being equal to or less than 4.3 weight percent based on oxide;
  to minimize surface crystal bands;
 (iii.) said glass ceramic comprises:
  less than 200 parts per million iron oxide ($Fe_2O_3$); and less than 2.5 weight percent of titanium dioxide ($TiO_2$), on an oxide basis;
  to minimize coloration due to iron oxide and titanium dioxide upon vitrification;
 (iv.) said glass ceramic comprises glass configured to have, at a thickness of 4 millimeters, light transmittances of one of:
  more than 89 percent; and
  more than 90 percent;
 (v.) said glass ceramic being substantially free of barium oxide (BaO);
 (vi.) said glass ceramic is configured to have:
  a coefficient of thermal expansion $\alpha_{20/300}$ between 3.5 millionths per degree Kelvin and 5.0 millionths per degree Kelvin;
  a transformation temperature $T_g$ between 600 and 750 degrees Celsius; and
  a processing temperature $V_A$ below 1350 degrees Celsius; and
 wherein said glass ceramic contains lithium oxide—aluminum oxide—silicon dioxide.

12. The glass ceramic according to claim 11 comprising one of (viii.), (ix.), (x.), (xi.), and (xii.):
 (viii.) said glass ceramic comprises colored glass;
  said colored glass comprises a coloring agent;
  said coloring agent comprising at least one compound of: vanadium (V), chromium (Cr), manganese (Mn), iron (Fe), cobalt (Co), copper (Cu), nickel (Ni), selenium (Se), and chlorine (Cl);
 (ix.) said glass ceramic comprises one of:
  (a.) a transparent glass-ceramic;
   a translucent glass-ceramic; and
   an opaque glass-ceramic;
  (b.) a glass-ceramic comprising keatite mixed crystals as the predominant crystal phase and said glass-ceramic being configured to have a coefficient of thermal expansion $\alpha_{20/700}$ of less than 1.5 millionths per degree Kelvin;
  (c.) a glass-ceramic comprising high quartz mixed crystals as the predominant crystal phase and said glass-ceramic being configured to have a coefficient of thermal expansion $\alpha_{20/700}$ in the range of one of:
   from minus 0.5 five millionths per degree Kelvin to 0.5 millionths per degree Kelvin; and
   minus 0.15 millionths per degree Kelvin to 0.15 millionths per degree Kelvin;
 (x.) said glass ceramic comprises a transparent glass-ceramic comprising in weight percent based on oxide:
  less than 2 percent of titanium dioxide ($TiO_2$);
  less than 0.5 percent of tin dioxide ($SnO_2$); and
  less than 200 parts per million iron oxide ($Fe_2O_3$); and
  said glass-ceramic being configured to have a light transmittance, at 4 millimeters thickness, of less than eighty percent;
 (xi.) said glass ceramic comprises a glass-ceramic being colored with a coloring agent comprising at least one compound of: vanadium (V), chromium (Cr), manganese (Mn), iron (Fe), cobalt (Co), nickel (Ni);
  said colored glass-ceramic being configured to have a light transmittance of less than five percent at a thickness of 4 millimeters; and
 (xii.) said glass ceramic comprises chemically prestressed glass;
  said chemically prestressed glass comprises:
  the sum of the percentage of lithium oxide ($Li_2O$) and the percentage of sodium oxide ($Na_2O$) being greater than 3.5 percent by weight based on oxide.

13. A float glass comprising:
 platinum, wherein the concentration of said platinum is contained in a non-zero amount less than 300 parts per billion;
 a concentration of rhodium in a non-zero amount less than 30 parts per billion;
 a concentration of zinc oxide in a non-zero amount less than 1.5 weight percent;

a concentration of tin dioxide in a non-zero amount less than 1 weight percent;

said concentrations of said platinum, rhodium, zinc oxide, and tin dioxide configuring said float glass to have minimized surface defects; and said float glass being configured to be one of:
  prestressable into a glass-ceramic comprising one of:
    high quartz mixed crystals; and
    keatite mixed crystals; and
  transformable into a glass-ceramic comprising one of:
    high quartz mixed crystals; and
    keatite mixed crystals.

14. The float glass according to claim 3, wherein:

said float glass comprises rhodium, zinc oxide, and tin dioxide;

said float glass comprises refined glass;

said refined glass being substantially free of both of (i.) and (ii.):
  (i.) arsenic oxide; and
  (ii.) antimony oxide; to minimize surface metallic coatings;

said float glass comprises a lithium oxide—aluminum oxide—silicon dioxide glass;

said float glass contains in weight percent on an oxide basis:

| | |
|---|---|
| lithium oxide ($Li_2O$) | 3.2–5.0 |
| aluminum oxide ($Al_2O_3$) | 19–25 |
| silicon dioxide ($SiO_2$) | 55–69 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | ≦1.5 |
| titanium dioxide ($TiO_2$) | 1.0–5.0 |
| zirconium dioxide ($ZrO_2$) | 1.0–2.5 |
| tin dioxide ($SnO_2$) | ≦1.0 |
| with the sum of titanium dioxide ($TiO_2$) + zirconium ($ZrO_2$) + tin dioxide ($SnO_2$) | 2.5–5.0 |
| phosphoric oxide ($P_2O_5$) | 0–3.0. |

15. The float glass according to claim 14, comprising one of (i.), (ii.), (iii.), (iv.), (v.), (vi.), (vii.), (viii.), (ix.), (x.), (xi.), (xii.), and (xiii.):

(i.) said float glass comprises in weight percent on an oxide basis a composition of:

| | |
|---|---|
| lithium oxide ($Li_2O$) | 3.2–5.0 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide ($Al_2O_3$) | 19–25 |
| silicon dioxide ($SiO_2$) | 55–69 |
| titanium dioxide ($TiO_2$) | 1.0–5.0 |
| zirconium dioxide ($ZrO_2$) | 1.0–2.5 |
| tin dioxide ($SnO_2$) | <1.0 |
| with the sum of titanium dioxide ($TiO_2$) + zirconium dioxide ($ZrO_2$) + tin dioxide ($SnO_2$) | 2.5–5.0 |
| phosphoric oxide ($P_2O_5$) | 0–3.0; |

(ii.) said float glass comprises colored glass;

said colored glass comprises a coloring agent;

said coloring agent comprises at least one compound of: vanadium (V), chromium (Cr), manganese (Mn), iron (Fe), cobalt (Co), copper (Cu), nickel (Ni), selenium (Se), and chlorine (Cl);

(iii.) said float glass comprises in weight percent on an oxide basis a composition of:

| | |
|---|---|
| lithium oxide ($Li_2O$) | 3.5–4.5 |
| sodium oxide ($Na_2O$) | 0.2–1.0 |
| potassium oxide ($K_2O$) | 0–0.8 |
| with the sum of sodium oxide ($Na_2O$) + potassium oxide ($K_2O$) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≦1.0 |
| aluminum oxide ($Al_2O_3$) | 19–24 |
| silicon dioxide ($SiO_2$) | 60–68 |
| titanium dioxide ($TiO_2$) | 1.0–2.0 |
| zirconium dioxide ($ZrO_2$) | 1.2–2.2 |
| tin dioxide ($SnO_2$) | ≦0.6 |
| with the sum of titanium dioxide ($TiO_2$) + zirconium dioxide ($ZrO_2$) + tin dioxide ($SnO_2$) | 3.0–4.5 |
| phosphoric oxide ($P_2O_5$) | 0–2.0; |

(iv.) said float glass comprises glass being configure to be chemically prestressable; and the sum of the percentage of lithium oxide ($Li_2O$) and the percentage of sodium oxide ($Na_2O$) being greater than 3.5 percent by weight based on oxide;

(v.) said float glass comprises chemically prestressable glass;

(vi.) said float glass comprises:
  the sum of 3.2 times the percentage of zinc oxide (ZnO) and the percentage of titanium dioxide ($TiO_2$) being equal to or less than 4.3 weight percent based on oxide to minimize surface crystal bands;

(vii.) said float glass comprises:

less than 200 parts per million iron oxide ($Fe_2O_3$); and less than 2.5 weight percent of titanium dioxide ($TiO_2$), on an oxide basis;

to minimize coloration due to iron oxide and titanium dioxide upon vitrification of said float glass;

(viii.) said float glass comprises glass being configured to have, at a thickness of 4 millimeters, light transmittances of one of:
  more than 89 percent; and
  more than 90 percent;

(ix.) said float glass being substantially free of: barium oxide (BaO);

(x.) said float glass is configured to have:
  a coefficient of thermal expansion $\alpha_{20/300}$ between 3.5 millionths per degree Kelvin and 5.0 millionths per degree Kelvin;
  a transformation temperature $T_g$ between 600 and 750 degrees Celsius; and processing temperature $V_A$ below 1350 degrees Celsius;

(xi.) said float glass comprises one of:
- (a.) a float glass being configured to be transformable into one of:
  - a transparent glass-ceramic;
  - a translucent glass-ceramic; and
  - an opaque glass-ceramic;
- (b.) a float glass being configured to be transformable into a glass-ceramic comprising keatite mixed crystals as the predominant crystal phase and said float glass being configured to have a coefficient of thermal expansion $\alpha_{20/700}$ of less than 1.5 millionths per degree Kelvin;
- (c.) a float glass being configured to be transformable into a glass-ceramic comprising high quartz mixed crystals as the predominant crystal phase and said float glass being configured to have a coefficient of thermal expansion $\alpha_{20/700}$ in the range of one of:
  - from minus 0.5 five millionths per degree Kelvin to 0.5 millionths per degree Kelvin; and
  - minus 0.15 millionths per degree Kelvin to 0.15 millionths per degree Kelvin;

(xii.) said float glass comprises a float glass transformable into a transparent glass-ceramic;

said glass-ceramic comprising in weight percent based on oxide:

less than 2 percent of titanium dioxide ($TiO_2$);

less than 0.5 percent of tin dioxide ($SnO_2$); and less than 200 parts per million iron oxide ($Fe_2O_3$); and said glass-ceramic being configured to have a light transmittance, at 4 millimeters thickness, of less than eighty percent;

(xiii.) said float glass comprises a float glass being configured to be transformable into a glass-ceramic;

said glass-ceramic being colored with a coloring agent comprising at least one compound of: vanadium (V), chromium (Cr), manganese (Mn), iron (Fe), cobalt (Co), nickel (Ni);

said glass-ceramic being configured to have a light transmittance of less than five percent at a thickness of 4 millimeters.

16. The float glass according to claim 14, comprising all of: (i.), (ii.), (iii.), (iv.), (v.), and (vi.):

(i.) one of (a.) and (b.):
- (a.) said float glass comprises in weight percent on an oxide basis a composition of:

| | |
|---|---|
| lithium oxide ($Li_2O$) | 3.2–5.0 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide ($Al_2O_3$) | 19–25 |
| silicon dioxide ($SiO_2$) | 55–69 |
| titanium dioxide ($TiO_2$) | 1.0–5.0 |
| zirconium dioxide ($ZrO_2$) | 1.0–2.5 |
| tin dioxide ($SnO_2$) | <1.0 |
| with the sum of titanium dioxide ($TiO_2$) + zirconium dioxide ($ZrO_2$) + tin dioxide ($SnO_2$) | 2.5–5.0 |
| phosphoric oxide ($P_2O_5$) | 0–3.0; and |

- (b.) said float glass comprises in weight percent on an oxide basis a composition of:

| | |
|---|---|
| lithium oxide ($Li_2O$) | 3.5–4.5 |
| sodium oxide ($Na_2O$) | 0.2–1.0 |
| potassium oxide ($K_2O$) | 0–0.8 |
| with the sum of sodium oxide ($Na_2O$) + potassium oxide ($K_2O$) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≤1.0 |
| aluminum oxide ($Al_2O_3$) | 19–24 |
| silicon dioxide ($SiO_2$) | 60–68 |
| titanium dioxide ($TiO_2$) | 1.0–2.0 |
| zirconium dioxide ($ZrO_2$) | 1.2–2.2 |
| tin dioxide ($SnO_2$) | ≤0.6 |
| with the sum of titanium dioxide ($TiO_2$) + zirconium dioxide ($ZrO_2$) + tin dioxide ($SnO_2$) | 3.0–4.5 |
| phosphoric oxide ($P_2O_5$) | 0–2.0; |

(ii.) said float glass comprises the sum of 3.2 times the percentage of zinc oxide (ZnO) and the percentage of titanium dioxide ($TiO_2$) being equal to or less than 4.3 weight percent based on oxide to minimize surface crystal bands;

(iii.) said float glass comprises:

less than 200 parts per million iron oxide ($Fe_2O_3$); and less than 2.5 weight percent of titanium dioxide ($TiO_2$), on an oxide basis;

to minimize coloration due to iron oxide and titanium dioxide upon vitrification of said float glass;

(iv.) said float glass comprises glass configured to have, at a thickness of 4 millimeters, light transmittances of one of:
- more than 89 percent; and
- more than 90 percent;

(v.) said float glass being substantially free of:
- barium oxide (BaO);

(vi.) said float glass is configured to have:
- a coefficient of thermal expansion $\alpha_{20/300}$ between 3.5 millionths per degree Kelvin and 5.0 millionths per degree Kelvin;
- a transformation temperature $T_g$ between 600 and 750 degrees Celsius; and
- a processing temperature $V_A$ below 1350 degrees Celsius.

17. The float glass according to claim 16 comprising one of (viii.), (ix.), (x.), (xi.), and (xii.):

(viii.) said float glass comprises colored glass;

said colored glass comprises a coloring agent;

said coloring agent comprising at least one compound of: vanadium (V), chromium (Cr), manganese (Mn), iron (Fe), cobalt (Co), copper (Cu), nickel (Ni), selenium (Se), and chlorine (Cl);

(ix.) said float glass comprises one of:
- (a.) a float glass being configured to be transformable into one of:

a transparent glass-ceramic;
a translucent glass-ceramic; and
an opaque glass-ceramic;
(b.) a float glass being configured to be transformable into a glass-ceramic comprising keatite mixed crystals as the predominant crystal phase and said float glass being configured to have a coefficient of thermal expansion $\alpha_{20/700}$ of less than 1.5 millionths per degree Kelvin;
(c.) a float glass being configured to be transformable into a glass-ceramic comprising high quartz mixed crystals as the predominant crystal phase and said float glass being configured to have a coefficient of thermal expansion $\alpha_{20/700}$ in the range of one of:
from minus 0.5 five millionths per degree Kelvin to 0.5 millionths per degree Kelvin; and
minus 0.15 millionths per degree Kelvin to 0.15 millionths per degree Kelvin;
(x.) said float glass comprises a float glass configured to be transformable into a transparent glass-ceramic;
said glass-ceramic comprising in weight percent based on oxide:
less than 2 percent of titanium dioxide ($TiO_2$);
less than 0.5 percent of tin dioxide ($SnO_2$); and
less than 200 parts per million iron oxide ($Fe_2O_3$); and
said glass-ceramic being configured to have a light transmittance, at 4 millimeters thickness, of less than eighty percent;
(xi.) said float glass comprises a float glass being configured to be transformable into a glass-ceramic;
said glass-ceramic being colored with a coloring agent comprising at least one compound of: vanadium (V), chromium (Cr), manganese (Mn), iron (Fe), cobalt (Co), nickel (Ni);
said glass-ceramic being configured to have a light transmittance of less than five percent at a thickness of 4 millimeters; and
(xii.) said float glass comprises glass being configured to be chemically prestressable;
said chemically prestressable glass comprises the sum of the percentage of lithium oxide ($Li_2O$) and the percentage of sodium oxide ($Na_2O$) being greater than 3.5 percent by weight based on oxide.

18. A flat glass ceramic comprising:
platinum, wherein the concentration of said platinum is contained in a non-zero amount less than 300 parts per billion;
a concentration of rhodium in a non-zero amount less than 30 parts per billion;
a concentration of zinc oxide in a non-zero amount less than 1.5 weight percent;
a concentration of tin dioxide in a non-zero amount less than 1 weight percent; and
said flat glass ceramic comprising one
high quartz mixed crystals; and
keatite mixed crystals.

19. The flat glass ceramic according to claim 18, comprising one of (i.), (ii), (iii.), (iv.), (v.), (vi.), (vii.), (viii.), (ix.), (x.), (xi.), (xii.), (xiii.), and (xiv.):
(i.) said flat glass ceramic comprises in weight percent on an oxide basis a composition of:

| | |
|---|---|
| lithium oxide ($Li_2O$) | 3.2–5.0 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide ($Al_2O_3$) | 19–25 |
| silicon dioxide ($SiO_2$) | 55–69 |
| titanium dioxide ($TiO_2$) | 1.0–5.0 |
| zirconium dioxide ($ZrO_2$) | 1.0–2.5 |
| tin dioxide ($SnO_2$) | <1.0 |
| with the sum of titanium dioxide ($TiO_2$) + zirconium dioxide ($ZrO_2$) + tin dioxide ($SnO_2$) | 2.5–5.0 |
| phosphoric oxide ($P_2O_5$) | 0–3.0; |

(ii.) said flat glass ceramic comprises colored glass;
said colored glass comprises a coloring agent;
said coloring agent comprises at least one compound of: vanadium (V), chromium (Cr), manganese (Mn), iron (Fe), cobalt (Co), copper (Cu), nickel (Ni), selenium (Se), and chlorine (Cl);
(iii.) said flat glass ceramic comprises in weight percent on an oxide basis a composition of:

| | |
|---|---|
| lithium oxide ($Li_2O$) | 3.5–4.5 |
| sodium oxide ($Na_2O$) | 0.2–1.0 |
| potassium oxide ($K_2O$) | 0–0.8 |
| with the sum of sodium oxide ($Na_2O$) + potassium oxide ($K_2O$) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≤1.0 |
| aluminum oxide ($Al_2O_3$) | 19–24 |
| silicon dioxide ($SiO_2$) | 60–68 |
| titanium dioxide ($TiO_2$) | 1.0–2.0 |
| zirconium dioxide ($ZrO_2$) | 1.2–2.2 |
| tin dioxide ($SnO_2$) | ≤0.6 |
| with the sum of titanium dioxide ($TiO_2$) + zirconium dioxide ($ZrO_2$) + tin dioxide ($SnO_2$) | 3.0–4.5 |
| phosphoric oxide ($P_2O_5$) | 0–2.0; |

(iv.) said flat glass ceramic comprises chemically prestressed float glass;
said chemically prestressed glass comprises: the sum of the percentage of lithium oxide ($Li_2O$) and the percentage of sodium oxide ($Na_2O$) being greater than 3.5 percent by weight based on oxide;
(v.) said flat glass ceramic comprises chemically prestressed glass;
(vi.) said flat glass ceramic comprises:
the sum of 3.2 times the percentage of zinc oxide (ZnO) and the percentage of titanium dioxide ($TiO_2$) being equal to or less than 4.3 weight percent based on oxide;
to minimize surface crystal bands;
(vii.) said flat glass ceramic comprises:
less than 200 parts per million iron oxide ($Fe_2O_3$); and
less than 2.5 weight percent of titanium dioxide ($TiO_2$), on an oxide basis;
to minimize coloration due to iron oxide and titanium dioxide upon vitrification of said flat float glass;

(viii.) said flat glass ceramic comprises glass being configured to have, at a thickness of 4 millimeters, light transmittances of one of:
  more than 89 percent; and
  more than 90 percent;
(ix.) said flat glass ceramic being substantially free of barium oxide (BaO);
(x.) said flat glass ceramic is configured to have:
  a coefficient of thermal expansion $\alpha_{20/300}$ between 3.5 millionths per degree Kelvin and 5.0 millionths per degree Kelvin;
  a transformation temperature $T_g$ between 600 and 750 degrees Celsius; and
  a processing temperature $V_A$ below 1350 degrees Celsius;
(xi.) said flat glass ceramic comprises one of:
  (a.) a flat glass ceramic comprising one of:
    a transparent glass-ceramic;
    a translucent glass-ceramic; and
    an opaque glass-ceramic;
  (b.) a glass-ceramic comprising keatite mixed crystals as the predominant crystal phase and said glass-ceramic being configured to have a coefficient of thermal expansion $\alpha_{20/700}$ of less than 1.5 millionths per degree Kelvin;
  (c.) a glass-ceramic comprising high quartz mixed crystals as the predominant crystal phase and said glass-ceramic being configured to have a coefficient of thermal expansion $\alpha_{20/700}$ in the range of one of:
    from minus 0.5 five millionths per degree Kelvin to 0.5 millionths per degree Kelvin; and
    minus 0.15 millionths per degree Kelvin to 0.15 millionths per degree Kelvin;
(xii.) said flat glass ceramic comprises transparent glass-ceramic comprising in weight percent based on oxide:
  less than 2 percent of titanium dioxide ($TiO_2$);
  less than 0.5 percent of tin dioxide ($SnO_2$); and
  less than 200 parts per million iron oxide ($Fe_2O_3$); and
  said glass-ceramic being configured to have a light transmittance, at 4 millimeters thickness, of less than eighty percent;
(xiii.) said flat glass ceramic comprises a glass-ceramic being colored with a coloring agent comprising at least one compound of: vanadium (V), chromium (Cr), manganese (Mn), iron (Fe), cobalt (Co), nickel (Ni);
  said colored glass-ceramic being configured to have a light transmittance of less than five percent at a thickness of 4 millimeters; and
(xiv.) said flat glass ceramic contains lithium oxide—aluminum oxide—silicon dioxide; and
  wherein said flat glass ceramic comprises rhodium, zinc oxide, and tin oxide.

20. The flat glass ceramic according to claim 18, comprising all of: (i.), (ii.), (iii.), (iv.), (v.), and (vi.):
(i.) one of (a.) and (b.):
  (a.) said flat glass ceramic comprises in weight percent on an oxide basis a composition of:

| | |
|---|---|
| lithium oxide ($Li_2O$) | 3.2–5.0 |
| sodium oxide ($Na_2O$) | 0–1.5 |
| potassium oxide ($K_2O$) | 0–1.5 |
| with the sum of sodium oxide ($Na_2O$) + potassium oxide ($K_2O$) | 0.2–2.0 |
| magnesium oxide (MgO) | 0.1–2.2 |
| calcium oxide (CaO) | 0–1.5 |
| strontium oxide (SrO) | 0–1.5 |
| barium oxide (BaO) | 0–2.5 |
| zinc oxide (ZnO) | <1.5 |
| aluminum oxide ($Al_2O_3$) | 19–25 |
| silicon dioxide ($SiO_2$) | 55–69 |
| titanium dioxide ($TiO_2$) | 1.0–5.0 |
| zirconium dioxide ($ZrO_2$) | 1.0–2.5 |
| tin dioxide ($SnO_2$) | <1.0 |
| with the sum of titanium dioxide ($TiO_2$) + zirconium dioxide ($ZrO_2$) + tin dioxide ($SnO_2$) | 2.5–5.0 |
| phosphoric oxide ($P_2O_5$) | 0–3.0; |

(b.) said flat glass ceramic comprises in weight percent on an oxide basis a composition of:

| | |
|---|---|
| lithium oxide ($Li_2O$) | 3.5–4.5 |
| sodium oxide ($Na_2O$) | 0.2–1.0 |
| potassium oxide ($K_2O$) | 0–0.8 |
| with the sum of sodium oxide ($Na_2O$) + potassium oxide ($K_2O$) | 0.4–1.5 |
| magnesium oxide (MgO) | 0.3–2.0 |
| calcium oxide (CaO) | 0–1.0 |
| strontium oxide (SrO) | 0–1.0 |
| barium oxide (BaO) | 0–2.5 |
| zinc oxide (ZnO) | ≦1.0 |
| aluminum oxide ($Al_2O_3$) | 19–24 |
| silicon dioxide ($SiO_2$) | 60–68 |
| titanium dioxide ($TiO_2$) | 1.0–2.0 |
| zirconium dioxide ($ZrO_2$) | 1.2–2.2 |
| tin dioxide ($SnO_2$) | ≦0.6 |
| with the sum of titanium dioxide ($TiO_2$) + zirconium dioxide ($ZrO_2$) + tin dioxide ($SnO_2$) | 3.0–4.5 |
| phosphoric oxide ($P_2O_5$) | 0–2.0; |

(ii.) said flat glass ceramic comprises:
  the sum of 3.2 times the percentage of zinc oxide (ZnO) and the percentage of titanium dioxide ($TiO_2$) being equal to or less than 4.3 weight percent based on oxide;
  to minimize surface crystal bands;
(iii.) said flat glass ceramic comprises:
  less than 200 parts per million iron oxide ($Fe_2O_3$); and less than 2.5 weight percent of titanium dioxide ($TiO_2$), on an oxide basis;
  to minimize coloration due to iron oxide and titanium dioxide upon vitrification;
(iv.) said flat glass ceramic comprises glass configure to have, at a thickness of 4 millimeters, light transmittances of one of:
  more than 89 percent; and
  more than 90 percent;
(v.) said flat glass ceramic being substantially free of barium oxide (BaO);
(vi.) said flat glass ceramic is configured to have:
  a coefficient of thermal expansion $\alpha_{20/300}$ between 3.5 millionths per degree Kelvin and 5.0 millionths per degree Kelvin;
  a transformation temperature $T_g$ between 600 and 750 degrees Celsius; and
  a processing temperature $V_A$ below 1350 degrees Celsius; and comprising one of (viii.), (ix.), (x.), (xi.), and (xii.):
(viii.) said flat glass ceramic comprises colored glass;
  said colored glass comprises a coloring agent;

said coloring agent comprising at least one compound of: vanadium (V), chromium (Cr), manganese (Mn), iron (Fe), cobalt (Co), copper (Cu), nickel (Ni), selenium (Se), and chlorine (Cl);

(ix.) said flat glass ceramic comprises one of:
  (a.) a transparent glass-ceramic;
    a translucent glass-ceramic; and
    an opaque glass-ceramic;
  (b.) a glass-ceramic comprising keatite mixed crystal as the predominant crystal phase and said glass-ceramic being configured to have a coefficient of thermal expansion $\alpha_{20/700}$ of less than 1.5 millionths per degree Kelvin;
  (c.) a glass-ceramic comprising high quartz mixed crystals as the predominant crystal phase and said glass-ceramic being configured to have a coefficient of thermal expansion $\alpha_{20/700}$ in the range of one of:
    from minus 0.5 five millionths per degree Kelvin to 0.5 millionths per degree Kelvin; and
    minus 0.15 millionths per degree Kelvin to 0.15 millionths per degree Kelvin;

(x.) said flat glass ceramic comprises a transparent glass-ceramic comprising in weight percent based on oxide:
  less than 2 percent of titanium dioxide ($TiO_2$);
  less than 0.5 percent of tin dioxide ($SnO_2$); and
  less than 200 parts per million iron oxide ($Fe_2O_3$); and
  said glass-ceramic being configured to have a light transmittance, at 4 millimeters thickness, of less than eighty percent;

(xi.) said flat glass ceramic comprises a glass-ceramic being colored with a coloring agent comprising at least one compound of: vanadium (V), chromium (Cr), manganese (Mn), iron (Fe), cobalt (Co), nickel (Ni);
  said colored glass-ceramic being configured to have a light transmittance of less than five percent at a thickness of 4 millimeters; and (xii.) said flat glass ceramic comprises chemically prestressed glass;
  said chemically prestressed glass comprises:
  the sum of the percentage of lithium oxide ($Li_2O$) and the percentage of sodium oxide ($Na_2O$) being greater than 3.5 percent by weight based on oxide; and
  wherein said flat glass ceramic comprises rhodium, zinc oxide, and tin oxide.

* * * * *

UNITED STATES PATENT AND TRADEMARK OFFICE
CERTIFICATE OF CORRECTION

PATENT NO. : 6,846,760 B2
DATED : January 25, 2005
INVENTOR(S) : Dr. Friedrich Siebers et al.

It is certified that error appears in the above-identified patent and that said Letters Patent is hereby corrected as shown below:

Column 12,
Line 37, after "percent," delete "Z" and insert -- $\Sigma$ --.
Line 65, delete "$ZnO+TiO_2 \prec 4.3$." and insert -- $ZnO+TiO_2 \leq 4.3$. --.

Column 14,
Line 2, after "Gerhard", delete "IAUTENSCHLÄGER," and insert
-- LAUTENSCHLÄGER, --.
Line 57, after "Peter", delete "NAsS," and insert -- NASS, --.

Column 18,
Line 61, after "to", delete "Gunthner" and insert -- Günthner --.

Signed and Sealed this

Seventh Day of June, 2005

JON W. DUDAS
*Director of the United States Patent and Trademark Office*